US011863937B2

(12) United States Patent
Silberzahn et al.

(10) Patent No.: US 11,863,937 B2
(45) Date of Patent: Jan. 2, 2024

(54) BINAURAL HEARING SYSTEM FOR PROVIDING SENSOR DATA INDICATIVE OF A PHYSIOLOGICAL PROPERTY, AND METHOD OF ITS OPERATION

(71) Applicant: SONOVA AG, Staefa (CH)

(72) Inventors: Konstantin Silberzahn, Meilen (CH); Anne Thielen, Stäfa (CH); Patrizia Richner, Männedorf (CH); Markus Leuthold, Stäfa (CH); Katja Dietrich, Rapperswil (CH); Adem Bici, Stäfa (CH); Matthias Riepenhoff, Hombrechtikon (CH); Evgeny Murtola, Dübendorf (CH); Emily Urry, Zollikon (CH)

(73) Assignee: Sonova AG, Staefa (CH)

( * ) Notice: Subject to any disclaimer, the term of this patent is extended or adjusted under 35 U.S.C. 154(b) by 176 days.

(21) Appl. No.: 17/688,552

(22) Filed: Mar. 7, 2022

(65) Prior Publication Data

US 2022/0329952 A1 Oct. 13, 2022

(30) Foreign Application Priority Data

Mar. 30, 2021 (EP) .................................... 21166105

(51) Int. Cl.
*H04R 25/00* (2006.01)

(52) U.S. Cl.
CPC ......... *H04R 25/505* (2013.01); *H04R 25/552* (2013.01); *H04R 25/603* (2019.05); *H04R 2225/025* (2013.01)

(58) Field of Classification Search
CPC .. H04R 25/505; H04R 25/552; H04R 25/554; H04R 2225/025; H04R 2225/61; H04R 2420/07; H04R 2460/03; H04R 1/1041
See application file for complete search history.

(56) References Cited

U.S. PATENT DOCUMENTS

2008/0287752 A1* 11/2008 Stroetz ................. A61B 5/6817 600/301
2017/0041711 A1 2/2017 Inakoshi
(Continued)

FOREIGN PATENT DOCUMENTS

CN 107961001 A 4/2018
WO 2020192956 A1 10/2020

OTHER PUBLICATIONS

"Extended European Search Report received in EP Application No. 21166105.3 dated Oct. 18, 2021".
(Continued)

*Primary Examiner* — Tuan D Nguyen
(74) *Attorney, Agent, or Firm* — ALG Intellectual Property, LLC

(57) ABSTRACT

The disclosure relates to a hearing system including a first hearing device configured to be worn at a first ear of a user and a second hearing device configured to be worn at a second ear of the user. The first hearing device includes a first physiological sensor configured to provide sensor data indicative of a physiological property of the user and the second hearing device includes a second physiological sensor configured to provide sensor data indicative of the same physiological property as the sensor data provided by the first physiological sensor. A processing unit may be configured to control the first and second physiological sensor to alternatingly provide the sensor data in subsequent time intervals.

20 Claims, 8 Drawing Sheets

(56) References Cited

U.S. PATENT DOCUMENTS

| | | | |
|---|---|---|---|
| 2017/0064428 A1 | 3/2017 | Hirsch | |
| 2017/0065228 A1 | 3/2017 | Hirano | |
| 2017/0215011 A1* | 7/2017 | Goldstein | H04R 25/305 |
| 2019/0116415 A1 | 4/2019 | Qian et al. | |
| 2020/0138299 A1 | 5/2020 | Goldman | |
| 2020/0196071 A1 | 6/2020 | Larsen et al. | |
| 2020/0405159 A1 | 12/2020 | Archdeacon | |
| 2021/0169417 A1 | 6/2021 | Burton | |
| 2021/0177281 A1 | 6/2021 | McCombie et al. | |
| 2021/0289298 A1* | 9/2021 | Roeck | A61B 5/6817 |
| 2021/0298670 A1 | 9/2021 | Roeck et al. | |

OTHER PUBLICATIONS

Allen, et al., "Photoplethysmography and its application in clinical physiological measurement", Physiol. Meas. 28 (2007) R1-R39, DOI: 10.1088/0967-3334/28/3/R01.

* cited by examiner

BINAURAL HEARING SYSTEM FOR PROVIDING SENSOR DATA INDICATIVE OF A PHYSIOLOGICAL PROPERTY, AND METHOD OF ITS OPERATION

RELATED APPLICATIONS

The present application claims priority to EP Patent Application No. EP21166105, filed Mar. 30, 2021, the contents of which are hereby incorporated by reference in their entirety.

BACKGROUND INFORMATION

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to output sound based on an audio signal which may be communicated by a wire or wirelessly to the hearing device. A hearing device may also be used to reproduce a sound in a user's ear canal detected by a microphone. The reproduced sound may be amplified to account for a hearing loss, such as in a hearing instrument, or may be output without accounting for a hearing loss, for instance to provide for a faithful reproduction of detected ambient sound and/or to add sound features of an augmented reality in the reproduced ambient sound, such as in a hearable. A hearing device may also provide for a situational enhancement of an acoustic scene, e.g. beamforming and/or active noise cancelling (ANC), with or without amplification of the reproduced sound. A hearing device may also be implemented as a hearing protection device, such as an earplug, configured to protect the user's hearing. Different types of hearing devices configured to be worn at an ear include earbuds, earphones, hearables, and hearing instruments such as receiver-in-the-canal (RIC) hearing aids, behind-the-ear (BTE) hearing aids, in-the-ear (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices configured to be worn at different ears of the user is sometimes also referred to as a binaural hearing device.

Some hearing devices have been proposed which include a physiological sensor for providing sensor data indicative of a physiological property of the user. For example, the physiological sensor may be implemented as an optical sensor including a light source and a photodetector to collect photoplethysmogram (PPG) data, as disclosed in international patent application No. PCT/EP2019/086071 and U.S. patent application Ser. No. 16/834,252. The light source is used to illuminate tissue inside the ear canal and the photodetector detects the light returning from the tissue at the device. Based on the detected light, it is possible to determine changes in light absorption caused by the blood flowing through the tissue during a heartbeat sequence. Physiological information such as heart rate, blood pressure, blood oxygen levels, breathing rate or volume, and the like can then be determined from this PPG data.

Equipping both hearing devices of the binaural hearing system with such a physiological sensor can, on the one hand, have the advantage of obtaining information about the physiological property at a higher certainty and/or with an increased information content as compared to when the physiological sensor would only be implemented in one of the hearing devices. But the information-related benefit comes at a cost of a higher power consumption required to simultaneously operate the two sensors. Available power can be rather limited in a hearing device due to inherent size restrictions only allowing to incorporate a comparatively small battery, and due to a variety of different components other than the sensor which need to be supplied with power to fulfill a desired functionality of the hearing device such as improving the hearing or communication capability of the user. Yet, in a binaural hearing system, each of the two hearing devices is commonly equipped with a battery, and an optimal utilization of the resulting power resources would be highly desirable.

On the other hand, when equivalent sensors each providing sensor data indicative of the same physiological property are included in the two hearing devices, the twofold information obtained at the two ears can quite often be redundant. Such a redundancy may serve as a reliability check for the sensor data, but may also import a rather little benefit in relation to the costs in power consumption, at least in situations in which a reliable operation of at least one of the sensors can be assumed or has been verified before. In other situations, the sensor data obtained at both ears can be more valuable, for instance when a comparison between the sensor data obtained at the first ear and the sensor data obtained at the second ear is employed to draw further conclusions about a certain property, which may be a property related to the user and/or a property regarding a functionality of the hearing devices. The sensor data obtained at both ears can also be useful to verify the reliability of the sensor data obtained by each of the sensors, at least sometimes when it seems appropriate. The sensor data obtained at both ears can also help to improve the quality of the sensor data of one of the sensors or both of the sensors in a case in which the quality of the sensor data of at least one of the sensors would be found to be below a desired quality level. It would therefore be desirable to enable the hearing system to provide the sensor data in a way which would take into account the different situations in which a certain timing in which the sensor data would be obtained at one of the ears or at both ears could import a larger benefit.

BRIEF DESCRIPTION OF THE DRAWINGS

Reference will now be made in detail to embodiments, examples of which are illustrated in the accompanying drawings. The drawings illustrate various embodiments and are a part of the specification. The illustrated embodiments are merely examples and do not limit the scope of the disclosure. Throughout the drawings, identical or similar reference numbers designate identical or similar elements. In the drawings.

DETAILED DESCRIPTION

Figure 1:
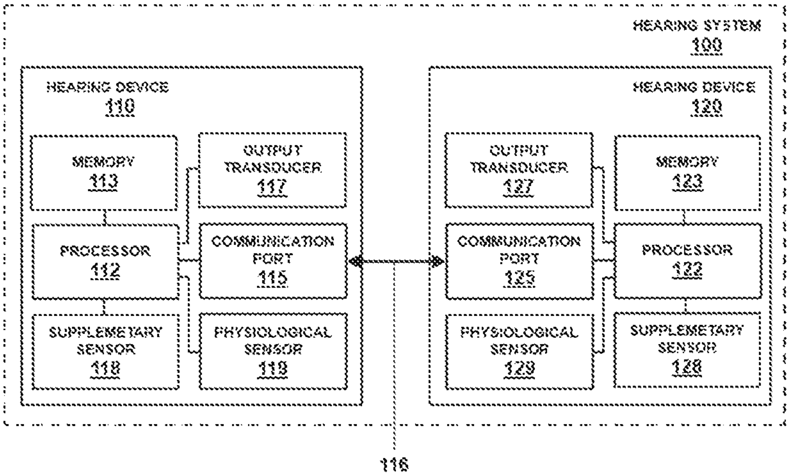
FIG. 1 schematically illustrates an exemplary hearing system comprising two hearing devices each configured to be worn at a respective ear of a user.

The disclosure relates to a hearing system comprising a first hearing device configured to be worn at a first ear of a user, and a second hearing device configured to be worn at a second ear of the user, both hearing devices comprising a physiological sensor configured to provide sensor data indicative of a physiological property detected on the user, according to the preamble of claim 1. The disclosure also relates to a method of operating the hearing system, according to the preamble of claim 15, and a computer-readable medium storing instructions for performing the method.

It is a feature of the present disclosure to avoid at least one of the above mentioned disadvantages and to equip a hearing system with a capability to provide the sensor data obtained by a respective physiological sensor included in each of the hearing devices worn at the two ears in an optimized way, in particular by balancing a desire for a high accuracy and/or reliability and/or quality of the sensor data with an interest in a low power consumption of the physiological sensors. It is another feature to equip the hearing system with the capability of a minimum power consumption without compromising the accuracy and/or reliability and/or quality of the sensor data. It is a further feature to enable the hearing system to provide the sensor data with an increased accuracy and/or reliability and/or quality depending on a momentary situation of usage of the hearing system, in particular to distinguish between situations in which the increased accuracy and/or reliability and/or quality is more desirable as compared to other situations in which it is less desirable. It is a further feature to improve the accuracy and/or reliability and/or quality of the sensor data also relative to previously known hearing systems, at least in some usage situations. It is yet another feature to enhance an operational safety of the hearing system, in particular with regard to an unwanted exhaustion of the available power sources and/or a predominant utilization of an available power source as compared to another available power source. It is a further feature to implement at least one of these features with a rather low constructional effort.

At least one of these features can be achieved in accordance with the embodiments described herein.

Accordingly, the present disclosure proposes a hearing system comprising a first hearing device configured to be worn at a first ear of a user, the first hearing device comprising a first physiological sensor configured to provide sensor data indicative of a physiological property of the user; a second hearing device configured to be worn at a second ear of the user, the second hearing device comprising a second physiological sensor configured to provide sensor data indicative of the same physiological property as the sensor data provided by the first physiological sensor; and a processing unit configured to control the first and second physiological sensor to provide the sensor data to the processing unit in subsequent time intervals, wherein, in at least one of said subsequent time intervals, one of the first and second physiological sensor is controlled to provide the sensor data to the processing unit and the other of the first and second physiological sensor is controlled to abstain from providing the sensor data to the processing unit.

In this way, by controlling the physiological sensor of one hearing device to abstain from providing the sensor data in a time interval in which the sensor data is provided by the physiological sensor of the other hearing device, a power consumption for providing the sensor data can be effectively reduced. A temporary reduction of an accuracy and/or reliability and/or quality of the sensor data provided during this time interval, if existing, can then be compensated by the sensor data provided in a different time interval within the sequence, for instance by controlling at least the physiological sensor that has been controlled to abstain from providing the sensor data to provide the sensor data in the different time interval. Such a mode of operation of the processing unit when controlling the physiological sensors included in the hearing devices worn at the different ears may be based on the recognition that a simultaneous provision of the sensor data obtained at the different ears is not always necessary or may be, in some cases, even detrimental for providing the sensor data with a desired accuracy and/or reliability and/or quality, for instance when the sensor data provided from one of the physiological sensors suffers from a bad signal quality.

Independently, the present disclosure proposes a method of operating a hearing system, the hearing system comprising a first hearing device configured to be worn at a first ear of a user, the first hearing device comprising a first physiological sensor configured to provide sensor data indicative of a physiological property detected on the user; a second hearing device configured to be worn at a second ear of the user, the second hearing device comprising a second physiological sensor configured to provide sensor data indicative of the same physiological property as the sensor data provided by the first physiological sensor, wherein the method comprises controlling the first and second physiological sensor to provide the sensor data in subsequent time intervals, wherein, in at least one of said subsequent time intervals, one of the first and second physiological sensor is controlled to provide the sensor data and the other of the first and second physiological sensor is controlled to abstain from providing the sensor data.

Independently, the present disclosure proposes a non-transitory computer-readable medium storing instructions that, when executed by a processing unit included in the hearing system, cause the processing unit to perform said method of operating a hearing system.

Subsequently, additional features of some implementations of the method and/or the method of operating a hearing system are described. Each of those features can be provided solely or in combination with at least another feature. The features can be correspondingly provided in some implementations of the hearing system and/or the method and/or the computer-readable medium.

In some implementations, the processing unit is configured to control one of the first and second physiological sensor to provide the sensor data to the processing unit and the other of the first and second physiological sensor to abstain from providing the sensor data to the processing unit in a first number of time intervals of said subsequent time intervals, and to control the first and second physiological sensor to simultaneously provide the sensor data to the processing unit at an equal time in a second number of time intervals of said subsequent time intervals. The first number of time intervals may be larger than the second number of time intervals. In some instances, the first number of time intervals is at least two times larger than the second number of time intervals. In some instances, the first number of time intervals is at least ten times larger than the second number of time intervals. In this way, a power consumption of the physiological sensors may be reduced by still providing a good quality of the sensor data, in particular to enable determining of a quality measure based on the sensor data provided during the second number of time intervals.

In some implementations, the processing unit is configured to control, in a binaural operational mode, the first and second physiological sensor to alternatingly provide the sensor data to the processing unit in at least two of said subsequent time intervals. Thus, during a first time interval of said subsequent time intervals, the sensor data of one of the first and second physiological sensor may be provided to the processing unit, and, during a second time interval of said subsequent time intervals different from the first time interval, the sensor data of the other of the first and second physiological sensor may be provided to the processing unit.

In some implementations, the processing unit is configured to control, in a monaural operational mode, one of the first and second physiological sensor to provide the sensor data to the processing unit in all of said subsequent time intervals, and the other of the first and second physiological sensor to abstain from providing the sensor data to the processing unit in all of said subsequent time intervals.

In some implementations, the processing unit is configured to change from an operational mode, in which said controlling of one of the first and second physiological sensor to provide the sensor data to the processing unit and the other of the first and second physiological sensor to abstain from providing the sensor data to the processing unit in at least one of said subsequent time intervals is operated, into a synchronous operational mode, in which the first and second physiological sensor are controlled to simultaneously provide the sensor data to the processing unit at an equal time in all of said subsequent time intervals.

In some implementations, the processing unit is configured to determine, in said binaural operational mode, a priority parameter indicative of a priority of the monaural operational mode relative to the binaural operational mode and/or a priority of the synchronous operational mode relative to the binaural operational mode; and change, depending on the priority parameter, from the binaural operational mode to the monaural operational mode; or change, depending on the priority parameter, from the binaural operational mode to the synchronous operational mode.

In some implementations, the processing unit is configured to operate in a binaural operational mode. The binaural operational mode may comprise an asynchronous operational mode and/or a mixed operational mode and/or a synchronous operational mode. In the asynchronous operational mode, the processing unit can be configured to control the first and second physiological sensor to alternatingly provide the sensor data to the processing unit in all of said subsequent time intervals. Thus, in each time interval of said subsequent time intervals, one of first and second physiological sensor may be controlled to provide the sensor data to the processing unit and the other of first and second physiological sensor may be controlled to abstain from providing the sensor data to the processing unit, wherein the first physiological sensor is controlled to provide the sensor data in at least one of the subsequent time intervals, and the second physiological sensor is controlled to provide the sensor data in at least one other of the subsequent time intervals. In the synchronous operational mode, the processing unit can be configured to control the first and second physiological sensor to simultaneously provide the sensor data at an equal time in all of said subsequent time intervals. Thus, in each time interval of the subsequent time intervals, both of first and second physiological sensor may be controlled to provide the sensor data to the processing unit. In the mixed operational mode, the processing unit can be configured to control one of the first and second physiological sensor to provide the sensor data and the other of the first and second physiological sensor to abstain from providing the sensor data to the processing unit in at least one of the subsequent time intervals, and to control the first and second physiological sensor to simultaneously provide the sensor data at an equal time in at least one other of the subsequent time intervals.

In some implementations of the mixed operational mode, the processing unit can be configured to control the first and second physiological sensor to alternatingly provide the sensor data in at least two of the subsequent time intervals, in particular such that the first physiological sensor is controlled to provide the sensor data and the second physiological sensor is controlled to abstain from providing the sensor data in at least one of the subsequent time intervals, and the second physiological sensor is controlled to provide the sensor data and the first physiological sensor is controlled to abstain from providing the sensor data in at least one other of the subsequent time intervals, and to control the first and second physiological sensor to simultaneously provide the sensor data at an equal time in at least one further of the subsequent time intervals.

In some implementations, the processing unit is configured to operate in a monaural operational mode. The monaural operational mode may comprise a first ear operational mode and/or a second ear operational mode. In the first ear operational mode, the processing unit can be configured to control the first physiological sensor to provide the sensor data to the processing unit and the second physiological sensor to abstain from providing the sensor data to the processing unit in all of the subsequent time intervals. In the second ear operational mode, the processing unit can be configured to control the second physiological sensor to provide the sensor data to the processing unit and the first physiological sensor to abstain from providing the sensor data to the processing unit in all of the subsequent time intervals.

In some implementations, the processing unit is configured to determine a first quality measure indicative of a quality of the sensor data provided by the first physiological sensor, and a second quality measure indicative of a quality of the sensor data provided by the second physiological sensor, wherein said priority parameter is determined depending on the first quality measure and the second quality measure.

In some implementations, the first and second physiological sensor is each an optical sensor, in particular a PPG sensor, or each an bioelectric sensor, in particular an EEG sensor or an ECG sensor or an EOG sensor, or each a movement sensor, in particular an accelerometer, or each a temperature sensor.

In some implementations, the first hearing device comprises a first supplementary sensor supplementary to the first physiological sensor, the first supplementary sensor configured to provide sensor data indicative of a different property of the user and/or an environment of the user than the sensor data provided by the first physiological sensor, in particular a different physiological property of the user than the sensor data provided by the first physiological sensor and/or a property detected in an environment of the user; and the second hearing device comprises a second supplementary sensor supplementary to the second physiological sensor, the second supplementary sensor configured to provide sensor data indicative of the same property as the first supplementary sensor, wherein the processing unit is configured to determine the first and second quality measure based on the sensor data provided by the first and second supplementary sensor.

In some implementations, the first and second supplementary sensor is each a supplementary physiological sensor supplementary to the respective first and second physiological sensor or is each an environmental sensor supplementary to the respective first and second physiological sensor. Each of the supplementary physiological sensor can be, for instance, an optical sensor or a bioelectric sensor or a movement sensor or a temperature sensor. Each of the environmental sensor can be, for instance, a sound sensor or a temperature sensor or a barometric sensor or an optical sensor.

In some implementations, the first and second supplementary sensor is each configured to detect a temperature, wherein the first and second quality measure is determined based on the detected temperatures. In some implementations, the first supplementary sensor is configured to detect a movement of the first hearing device and the second supplementary sensor is configured to detect a movement of the second hearing device, wherein the first and second quality measure is determined based on the detected movements.

In some implementations, the processing unit is configured to determine the first quality measure based on a signal-to-noise ratio of the sensor data provided by the first physiological sensor, and the second quality measure based on a signal-to-noise ratio of the sensor data provided by the second physiological sensor.

In some implementations, the first and second physiological sensor each comprise a light source and a photodetector configured to detect light emitted from the light source, wherein the processing unit is configured to determine the first and second quality measure based on light detected by the photodetectors which is unrelated to the light emitted by the light source. In some instances, the processing unit is configured to determine the first quality measure based on light detected by the photodetector of the first physiological sensor at a wavelength different from a wavelength of the light emitted by the light source of the first physiological sensor, and the second quality measure based on light detected by the photodetector of the second physiological sensor at a wavelength different from a wavelength of the light emitted by the light source of the second physiological sensor.

In some implementations, the first and second physiological sensor is each an optical sensor, in particular a PPG sensor, comprising a light source and a photodetector. The optical sensor may be configured to provide PPG data, in particular a PPG waveform. The PPG data may comprise a waveform strongly varying over time, and a baseline more slowly varying over time. In some instances, the processing unit is configured to determine the first quality measure based on a ratio between the waveform and the baseline in the PPG data provided by the first physiological sensor, and the second quality measure based on a ratio between the waveform and the baseline in the PPG data provided by the second physiological sensor.

In some implementations, the first hearing device comprises a first battery and the second hearing device comprises a second battery, the processing unit configured to obtain information about a charging status of the first and second battery, wherein said priority parameter is determined depending on the charging status of the first and second battery.

In some implementations, the processing unit is configured to control the first and second physiological sensor to abstain from providing the sensor data to the processing unit during an intermediate time interval between said subsequent time intervals. The intermediate time interval may be provided between at least two consecutive time intervals of said subsequent time intervals, in particular between each two consecutive time intervals of said subsequent time intervals. In some implementations, the intermediate time interval is longer than each time interval in which the first physiological sensor and/or the second physiological sensor is controlled to provide the sensor data in said subsequent time intervals. In some instances, the intermediate time interval is at least two times longer. In some instances, the intermediate time interval is at least ten times longer. In some instances, the length of each time interval in which the first physiological sensor and/or the second physiological sensor is controlled to provide the sensor data in said subsequent time intervals is at most one minute.

In some implementations, the processing unit comprises a first processor included in the first hearing device and a second processor included in the second hearing device, wherein the first processor and the second processor are communicatively coupled. The first hearing device may comprise a first communication unit, and the second hearing device may comprise a second communication unit, wherein the first processor and the second processor are communicatively coupled via the first and second communication unit.

FIG. 1 illustrates an exemplary hearing system 100 comprising a first hearing device 110 configured to be worn at a first ear of a user, and a second hearing device 120 configured to be worn at a second ear of the user. Hearing devices 110, 120 may each be implemented by any type of hearing device configured to enable or enhance hearing by a user wearing hearing device 110, 120. For example, hearing device 110, 120 may be implemented by a hearing aid configured to provide an audio content such as an amplified version of a detected ambient sound to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis. As another example, hearing device 110, 120 may be implemented by an earbud or an earphone or a hearable configured to reproduce an audio content communicated by a wire or wirelessly to hearing device 110, 120 and/or to reproduce a detected ambient sound with or without altering the ambient sound and/or adding sound features to the ambient sound.

In the illustrated example, first hearing device 110 includes a processor 112 communicatively coupled to a memory 113, an output transducer 117, a communication port 115, and a physiological sensor 119. Further in this example, second hearing device 120 has a corresponding configuration including another processor 122 communicatively coupled to another memory 123, another output transducer 127, another communication port 125, and another physiological sensor 129. A processing unit includes processor 112 of first hearing device 110 and processor 122 of second hearing device 120. Other configurations are conceivable in which, for instance, processor 112, 122 is only provided in one of hearing devices 110, 120 such that the processing unit includes only one of the processors. Hearing devices 110, 120 may include additional or alternative components as may serve a particular implementation.

Output transducer 117, 127 may be implemented by any suitable audio transducer configured to output an audio signal to the user, for instance a receiver of a hearing aid, an output electrode of a cochlear implant system, or a loudspeaker of an earbud. The audio transducer may be implemented as an acoustic transducer configured to generate sound waves when outputting the audio signal. Output transducer 117 of first hearing device 110 is subsequently referred to as a first output transducer. Output transducer 127 of second hearing device 120 is subsequently referred to as a second output transducer.

Physiological sensor 119, 129 is configured to provide sensor data indicative of a physiological property of the user. For example, physiological sensor 119, 129 may be implemented by a biometric sensor configured to provide sensor data indicative of a biometric property of the user. The physiological sensor may be implemented by any suitable detection device configured to detect the physiological property and to provide corresponding sensor data. The physiological property may comprise any measurable biological and/or biometric characteristic of a human being, in particular the user, such as a vital sign and/or a physiological characteristic of the human being. The biological characteristic may be measured by detecting any form of energy and/or matter intrinsic to the human being and/or emitted from the human being and/or caused by the human being. Physiological sensor 119 of first hearing device 110 is referred to as a first physiological sensor. Physiological sensor 129 of second hearing device 120 is referred to as a second physiological sensor. Second physiological sensor 129 is configured to provide sensor data indicative of the same physiological property of the user as the sensor data provided by first physiological sensor 119.

Processing unit 112, 122 is communicatively coupled to first and second physiological sensor 119, 120. Processing unit 112, 122 can thus receive the sensor data provided by first and second physiological sensor 119, 120. Processing unit 112, 122 can also control first and second physiological sensor 119, 120 to provide the sensor data to processing unit 112, 122. In particular, as illustrated, processor 112 included in first hearing device 110 can be communicatively coupled to first physiological sensor 119 and processor 122 included in second hearing device 120 can be communicatively coupled to second physiological sensor 129.

As illustrated, each hearing device 110, 120 may further comprise a supplementary sensor 118, 128 which may be provided in addition to the respective first and second physiological sensor in the respective hearing device 110, 120. Supplementary sensor 118, 128 may be another physiological sensor configured to provide sensor data indicative of a different physiological property of the user than the sensor data provided by first and second physiological sensor 119, 129. The supplementary sensor may also be a sensor different from a physiological sensor configured to provide sensor data indicative of a property different from a physiological property of the user. For instance, the supplementary sensor may be an environmental sensor configured to provide sensor data indicative of a property detected in an environment of the user when hearing devices 110, 120 are worn by the user. The environmental sensor may be implemented by any suitable detection device configured to detect a property of an ambient environment of hearing device 110, 120. Supplementary sensor 118 of first hearing device 110 is referred to as a first supplementary sensor. Supplementary sensor 128 of second hearing device 120 is referred to as a second supplementary sensor. Second supplementary sensor 128 may be configured to provide sensor data indicative of the same property as first supplementary sensor 118. To illustrate, first and second supplementary sensor 118, 128 may each be implemented as a sound sensor, for instance a microphone or a microphone array, configured to detect sound in the environment of the user and to provide an audio signal indicative of the detected sound.

Processing unit 112, 122 can be communicatively coupled to first and second supplementary sensor 118, 128. Processing unit 112, 122 can thus receive the sensor data provided by first and second supplementary sensor 118, 128. Processing unit 112, 122 may also control first and second supplementary sensor 118, 128 to provide the sensor data to processing unit 112, 122. In particular, as illustrated, processor 112 included in first hearing device 110 can be communicatively coupled to first supplementary sensor 118, and processor 122 included in second hearing device 120 can be communicatively coupled to second supplementary sensor 128.

Communication port 115, 125 may be implemented by any suitable data transmitter and/or data receiver and/or data transducer configured to exchange data between first hearing device 110 and second hearing device 120 via a communication link 116. Communication port 115, 125 may be configured for wired and/or wireless data communication. In particular, data may be exchanged wirelessly via communication link 116 by radio frequency (RF) communication. For instance, data may be communicated in accordance with a Bluetooth™ protocol and/or by any other type of RF communication such as, for example, data communication via an internet connection and/or a mobile phone connection. Examples may include data transmission within a frequency band including 2.4 GHz and/or 5 GHz and/or via a 5G broadband cellular network and/or within a high band spectrum (HiBan) which may include frequencies above 20 GHz. Data may also be exchanged wirelessly via communication link 116 through the user's skin, in particular by employing skin conductance between the positions at which hearing devices 110, 120 are worn.

Communication ports 115, 125 may be employed for data communication in processing unit 112, 122. In particular, processor 112 included in first hearing device 110 and processor 122 included in second hearing device 120 can be communicatively coupled via communication ports 115, 125. Thus, processor 112 of first hearing device 110 and processor 122 of second hearing device 120 may exchange data via communication ports 115, 125.

The communicated data may comprise the sensor data provided by first physiological sensor 119 and/or the sensor data provided by second physiological sensor 129. The communicated data may also comprise sensor data provided by another sensor included in first hearing device 110 and/or sensor data provided by another sensor included in second hearing device 120, in particular sensor data provided by first supplementary sensor 118 and/or sensor data provided by second supplementary sensor 128. The communicated data may also comprise data processed by processing unit 112, 122, in particular the sensor data provided by the first and/or second physiological sensor processed by processing unit 112, 122 and/or the sensor data provided by the first and/or second supplementary sensor processed by processing unit 112, 122. To illustrate, sensor data provided by first physiological sensor 119 and/or first supplementary sensor 118 may be processed by processor 112 of first hearing device 110, and the processed sensor data may then be communicated to processor 122 of second hearing device 120. Sensor data provided by second physiological sensor 129 and/or second supplementary sensor 128 may be processed by processor 122 of second hearing device 120, and the processed sensor data may then be communicated to processor 112 of first hearing device 110.

The communicated data may be selected by processing unit 112, 122 and/or the data exchange between hearing devices 110, 120 may be controlled by processing unit 112, 122. For instance, processing unit 112, 122 may be configured to coordinate the data exchange between communication ports 115, 125 by controlling a pairing and/or handshaking operation between hearing devices 110, 120 and/or the like. Communication port 115 of first hearing device 110 is subsequently referred to as a first communication port. Communication port 125 of second hearing device 120 is subsequently referred to as a second communication port.

Memory 113, 123 may be implemented by any suitable type of storage medium and is configured to maintain, e.g. store, data controlled by processing unit 112, 122, in particular data generated, accessed, modified and/or otherwise used by processing unit 112, 122. For example, processing unit 112, 122 may control memory 113, 123 to maintain data. Memory 113, 123 may also be configured to store instructions for operating hearing system 100 that can be executed by processing unit 112, 122, in particular an algorithm and/or a software that can be accessed and executed by processing unit 112, 122. Memory 113, 123 may comprise a non-volatile memory from which the maintained data may be retrieved even after having been power cycled, for instance a flash memory and/or a read only memory (ROM) chip such as an electrically erasable programmable ROM (EEPROM). A non-transitory computer-readable medium may thus be implemented by memory 113, 123. Memory 113, 123 may also comprise a volatile memory, for instance a static or dynamic random access memory (RAM). A memory unit includes memory 113 of first hearing device 110 and memory 123 of second hearing device 120. Other configurations are conceivable in which memory 113, 123 is only provided in one of hearing devices 110, 120 such that the memory unit includes only one of the memories. Memory 113 of first hearing device 110 is subsequently referred to as a first memory. Memory 123 of second hearing device 120 is subsequently referred to as a second memory.

Processing unit 112, 122 is configured to control first and second physiological sensor 119, 129 to provide the sensor data to processing unit 112, 122. Processing unit 112, 122 is further configured to control first and second physiological sensor 119, 129 to provide the sensor data in subsequent time intervals, wherein, in at least one of said subsequent time intervals, one of first and second physiological sensor 119, 129 is controlled to provide the sensor data to processing unit 112, 122 and the other of first and second physiological sensor 119, 129 is controlled to abstain from providing the sensor data to processing unit 112, 122. These and other operations, which may be performed by processing unit 112, 122, are described in more detail in the description that follows.

In the illustrated example, processing unit 112, 122 comprises processor 112 of first hearing device 110 subsequently referred to as a first processor, and processor 122 of second hearing device 120 subsequently referred to as a second processor. In some implementations, the controlling of at least one sensor included in first hearing device 110, in particular first physiological sensor 119 and/or first supplementary sensor 118, is performed by first processor 112, and the controlling of at least one sensor included in second hearing device 120, in particular second physiological sensor 129 and/or second supplementary sensor 129, is performed by second processor 122. First processor 112 and second processor 122 may then be configured to exchange data with respect to a timing of the controlling of the sensors in said subsequent time intervals via communication ports 115, 125. In some implementations, the controlling of at least one sensor included in first hearing device 110 and the controlling of at least one sensor included in second hearing device 120 is performed by one of first processor 112 and second processor 122. A respective control signal for controlling at least one of the sensors may then be transmitted via communication ports 115, 125. Processing unit 112, 122 may be implemented, for instance, as a distributed processing system of processors 112, 122 and/or in a master/slave configuration of processors 112, 122. In some other implementations, the processing unit configured to perform those operations consists of processor 112 included in first hearing device 110 or processor 122 included in second hearing device 120.

Figure 2:
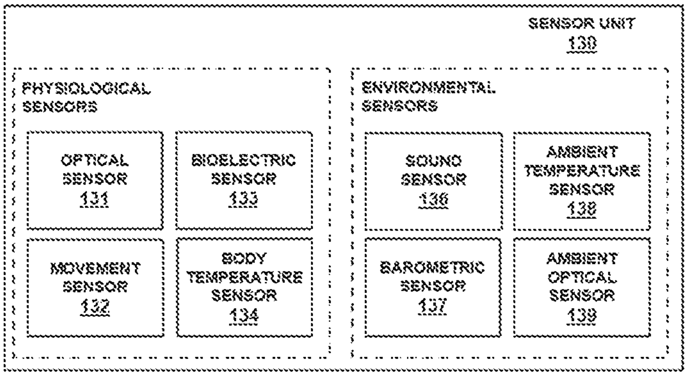
FIG. 2 schematically illustrates a sensor unit including at least one physiological sensor which may be implemented in a hearing device of the hearing system illustrated in FIG. 1.

FIG. 2 illustrates an exemplary sensor unit 130. Sensor unit 130 may be implemented in first hearing device 110 in the place of first physiological sensor 119 and/or first supplementary sensor 118. Sensor unit 130 may also be implemented in second hearing device 120 in the place of second physiological sensor 129 and/or second supplementary sensor 128. Sensor unit 130 comprises a physiological sensor configured to provide sensor data indicative of a physiological property of the user. As illustrated, the physiological sensor may be an optical sensor 131, or a movement sensor 132, or a bioelectric sensor 133, or a temperature sensor 134.

Optical sensor 131 may comprise at least one light source configured to emit light and at least one photodetector for detecting a reflected and/or scattered part of the light. The light source may be configured to emit the light into tissue at the ear when the respective hearing device 110, 120 in which optical sensor 131 is included is worn at the ear by the user. The photodetector may be configured to detect part of the emitted light scattered by the tissue. In particular, optical sensor 131 may be implemented as a photoplethysmography (PPG) sensor. Sensor data may be provided by the PPG sensor as a PPG waveform which may be indicative of a blood property, such as a heart rate and/or a blood pressure and/or a heart rate variability (HRV) and/or an oxygen saturation index (SpO2) and/or a maximum rate of oxygen consumption (VO2max), and/or a concentration of an analyte contained in the tissue, such as water and/or glucose.

Movement sensor 132 may be implemented by any suitable detector configured to provide sensor data indicative of a movement of hearing device 110, 120 in which movement sensor 132 is included. The sensor data can thus be indicative of a movement of the user when hearing device 110, 120 is worn at the ear by the user. The movement of the user can then indicate a vital sign of the user as the physiological property. In particular, movement sensor 132 may comprise at least one inertial sensor. The inertial sensor can include, for instance, an accelerometer configured to provide the sensor data indicative of an acceleration and/or a translational movement and/or a rotation, and/or a gyroscope configured to provide the movement data indicative of a rotation. Movement sensor 132 may also comprise an electronic compass such as a magnetometer configured to provide the sensor data indicative of a change of a magnet field, in particular the Earth's magnetic field, which can also be indicative of a movement of the user.

Bioelectric sensor 133 may be implemented by any electrophysiological detector configured to provide sensor data indicative of an electrophysiological activity of a human body, in particular the user's body when hearing device 110, 120 in which sensor unit 130 is included is worn by the user. Bioelectric sensor 133 may comprise at least one electrode or a plurality of electrodes. The electrode can be configured to detect an electric signal induced through a skin of the user. In particular, the electrode can be configured to pick up a low voltage electric signal from the skin and/or to determine an electric potential present between the skin and the environment and/or between different portions of the skin. The electrode may be configured to be placed at a skin of the user such that the electrode is in contact with the skin. In some instances, bioelectric sensor 133 may be implemented as an electrocardiography (ECG) sensor, or an electroencephalography (EEG) sensor, or an electrooculography (EOG) sensor. Sensor data provided by an ECG sensor can be indicative of a heart property, such as a heart rate. Sensor data provided by an EEG sensor can be indicative of a brain activity, for instance a cognitive load and/or a listening effort and/or a concentration level. Sensor data provided by an EOG sensor can be indicative of an eye gaze movement.

Temperature sensor 134 may be implemented as any detector sensitive to thermal radiation and/or conduction and/or convection and/or heat flow emitted from a human body, in particular the user's body when hearing device 110, 120 in which temperature sensor 134 is included is worn by the user. For instance, temperature sensor 134 may include a thermistor, thermopile, thermocouple, solid state sensor, and/or the like. Sensor data provided by temperature sensor 134 may thus be indicative of a body temperature. Temperature sensor 134 may also comprise a plurality of thermosensitive components. Sensor data provided by temperature sensor 134 may thus be indicative of a temperature at multiple regions of the ear, for instance at the inner ear and the outer ear, when hearing device 110, 120 in which sensor unit 130 is included is worn by the user in order to provide information about heat flowing between those regions.

In some implementations, any of physiological sensors 131-134 included in first hearing device 110 as first physiological sensor 119 may also be included in second hearing device 120 as second physiological sensor 129. Sensor data provided by the second physiological sensor can thus be indicative of the same physiological property as the sensor data provided by the first physiological sensor.

Sensor unit 130 may further comprise a supplementary sensor supplementary to the physiological sensor, which may be included in first hearing device 110 as first supplementary sensor 118 and/or in second hearing device 120 as second supplementary sensor 128. The supplementary sensor may be implemented as another physiological sensor. Sensor unit 130 may thus comprise two different physiological sensors, which may be selected from optical sensor 131, movement sensor 132, bioelectric sensor 133, and temperature sensor 134. The supplementary sensor may also be implemented as an environmental sensor configured to provide sensor data indicative of a property of an environment of the user. The environmental sensor may be implemented by any suitable detection device configured to detect a property of an ambient environment of hearing device 110, 120 in which the environmental sensor is included.

As illustrated, the environmental sensor may be, for instance, a sound sensor 136, a barometric sensor 137, a temperature sensor 138, or an optical sensor 139. Sound sensor 136 can be implemented as any device configured to detect a sound in an ambient environment of the user, in particular a microphone and/or a microphone array, and to provide sensor data indicative of the detected sound. Barometric sensor 137 can be implemented as any device configured to measure an air pressure in the ambient environment of the user and to provide sensor data indicative of the air pressure. Temperature sensor 138 may be implemented as any device configured to measure a temperature in the ambient environment of the user and to provide sensor data indicative of the ambient temperature, in particular a thermistor, thermopile, thermocouple, solid state sensor, and/or the like. Temperature sensor 138 may be oriented away from the user toward the ambient environment in order to measure the temperature of the ambient environment distinguished from the body temperature of the user. Optical sensor 139 may be implemented as any device configured to detect light in the ambient environment of the user and to provide sensor data indicative of the detected light. For instance, optical sensor 139 may be sensitive to a solar radiation spectrum and the sensor data may thus be indicative of a presence and/or an intensity of sunlight in the ambient environment of the user.

Any of physiological sensors 131-135 or any of environmental sensors 136-138 implemented in first hearing device 110 as first supplementary sensor 118 may be equally implemented in second hearing device 120 as second supplementary sensor 128. Sensor data provided by the second supplementary sensor can thus be indicative of the same property as the sensor data provided by the first supplementary sensor. Sensor unit 130 may further comprise at least another supplementary sensor supplementary to the physiological sensor which may be configured to provide sensor data indicative of a different property than the sensor data provided by the first and second physiological sensor and the sensor data provided by the first and second supplementary sensor. For instance, any other of physiological sensors 131-135 or any other of environmental sensors 136-138 may be implemented in first hearing device 110 as a third supplementary sensor, and may be equally implemented in second hearing device 120 as a fourth supplementary sensor.

Different types of hearing device 110, 120 can also be distinguished by the position at which they are worn at the ear. Some hearing devices, such as behind-the-ear (BTE) hearing aids and receiver-in-the-canal (RIC) hearing aids, typically comprise an earpiece configured to be at least partially inserted into an ear canal of the ear, and an additional housing configured to be worn at a wearing position outside the ear canal, in particular behind the ear of the user. Some other hearing devices, as for instance earbuds, earphones, hearables, in-the-ear (ITE) hearing aids, invisible-in-the-canal (IIC) hearing aids, and completely-in-the-canal (CIC) hearing aids, commonly comprise such an earpiece to be worn at least partially inside the ear canal without an additional housing for wearing at the different ear position.

Figure 3:
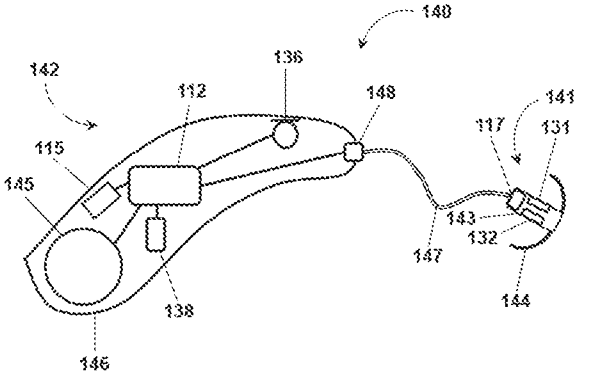
FIG. 3 schematically illustrates some embodiments of a hearing device of the hearing system illustrated in FIG. 1 in the form of a RIC hearing aid in a longitudinal sectional view.

FIG. 3 illustrates an exemplary implementation of first hearing device 110 as a RIC hearing aid 140, in accordance with some embodiments of the present disclosure. Second hearing device 120 may be correspondingly implemented. RIC hearing aid 140 comprises a BTE part 142 configured to be worn at an ear at a wearing position behind the ear, and an ITE part 141 configured to be worn at the ear at a wearing position at least partially inside an ear canal of the ear.

ITE part 141 is an earpiece comprising an ITE housing 143 at least partially insertable in the ear canal. Housing 143 encloses output transducer 117, optical sensor 131, and movement sensor 132. For instance, optical sensor 131 may be implemented as a PPG sensor. Movement sensor 132 may be implemented as an accelerometer. Housing 143 may further comprise a flexible member 144 adapted to contact an ear canal wall when housing 143 is at least partially inserted into the ear canal. An acoustical seal with the ear canal wall may thus be provided at the housing portion contacting the ear canal wall. The acoustic seal may at least partially block ambient sound from entering the ear canal.

BTE part 142 comprises a BTE housing 146 configured to be worn behind the ear. BTE housing 146 accommodates processor 112 communicatively coupled to communication port 115, sound sensor 136, and temperature sensor 138. BTE part 142 and ITE part 141 are interconnected by a cable 147. Processor 112 is communicatively coupled to output transducer 107, optical sensor 131, and movement sensor 132 of ITE part 141 via cable 147 and a cable connector 148 provided at BTE housing 146. Processor 112 can thus be configured to receive sensor data from optical sensor 131, movement sensor 132, sound sensor 136, and temperature sensor 138. Processor 112 can also be configured to control at least one of the sensors, in particular at least one of sensors 131, 132 included in ITE part 141, to provide the sensor data. BTE part 142 further includes a battery 145 as a power source for the above described components. Processor 112 can be communicatively coupled to battery 145 to obtain information about a charging status of battery 145. Battery 145 may be implemented in first hearing device 110 as a first battery. Battery 145 may also be implemented in second hearing device 120 as a second battery. Processor 122 of second hearing device 120 can then also be communicatively coupled to the second battery to obtain information about a charging status of the second battery. In this way, processing unit 112, 122 may obtain information about a charging status of the first and second battery.

In some implementations, first physiological sensor 119 of first hearing device 110 and second physiological sensor 129 of second hearing device 120 is each implemented as optical sensor 131. First supplementary sensor 118 of first hearing device 110 and second supplementary sensor 128 of second hearing device 120 may then each be implemented as any sensor selected from movement sensor 132, sound sensor 136, and temperature sensor 138. A third supplementary sensor included in first hearing device 110 and a fourth supplementary sensor included in second hearing device 120 may then each be implemented as any other sensor selected from movement sensor 132, sound sensor 136, and temperature sensor 138. A fifth supplementary sensor included in first hearing device 110 and a sixth supplementary sensor included in second hearing device 120 may then each be implemented as any other sensor selected from movement sensor 132, sound sensor 136, and temperature sensor 138.

Figure 4:
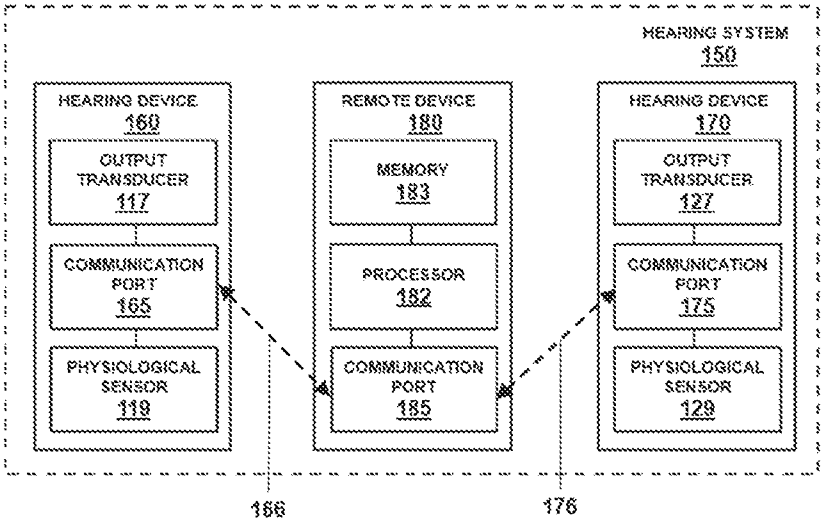
FIG. 4 schematically illustrates another exemplary hearing system comprising two hearing devices each configured to be worn at a respective ear of a user, and a remote device communicatively coupled to the hearing devices.

FIG. 4 illustrates another exemplary hearing system 150 comprising a first hearing device 160 configured to be worn at a first ear of a user, a second hearing device 170 configured to be worn at a second ear of the user, and a remote device 180 configured to be operated remote from the ears of the user. Hearing devices 160, 170 may each be implemented by any type of hearing device, for instance in accordance with hearing device 110, 120 described above. Remote device 180 may be an electronic device portable and/or wearable by the user. In particular, remote device 180 may be implemented as a communication device such as a smartphone, a smartwatch, a tablet and/or the like.

As illustrated, first hearing device 160 includes a communication port 165 communicatively coupled to output transducer 117 and first physiological sensor 119. Second hearing device 170 includes a communication port 175 communicatively coupled to second output transducer 127 and second physiological sensor 129. Remote device 180 includes a processor 182 communicatively coupled to a memory 183 and a communication port 185. Memory 183 may be implemented by any suitable type of storage medium and is configured to maintain data controlled by processor 182, for instance corresponding to memory 113, 123 described above. Communication ports 165, 175, 185 may be implemented by any suitable data transmitter and/or data receiver and/or data transducer configured to exchange data between first hearing device 160 and remote device 180 via a first communication link 166 and to exchange data between second hearing device 170 and remote device 180 via a second communication link 176, for instance corresponding to communication ports 115, 125 described above. Communication port 165 of first hearing device 160 is subsequently referred to as a first remote communication port. Communication port 175 of second hearing device 170 is subsequently referred to as a second remote communication port. First hearing device 160 and/or second hearing device 170 may further include first and/or second supplementary sensor 118, 128, as described above. The data communicated from first hearing device 160 to remote device 180 may comprise sensor data provided by first physiological sensor 119 and/or sensor data provided by first supplementary sensor 118, and the data communicated from second hearing device 170 to remote device 180 may comprise sensor data provided by second physiological sensor 129 and/or sensor data provided by second supplementary sensor 128. Processor 182 of remote device 180 can constitute a processing unit configured to control first and second physiological sensor 119, 129 to provide the sensor data to processing unit 182 in subsequent time intervals.

In some implementations, first hearing device 160 further includes first communication port 115, and second hearing device 170 further includes second communication port 125. The sensor data provided by first and/or second physiological sensor 119, 129 and/or sensor data provided by first and/or second supplementary sensor 118, 128 may thus also be communicated between first hearing device 160 and second hearing device 170 via communication link 116. In some implementations, first hearing device 160 further includes first processor 112, which may be communicatively coupled to first communication port 115 and first physiological sensor 119 and/or first supplementary sensor 118. Second hearing device 170 may further include second processor 122, which may be communicatively coupled to second communication port 125 and second physiological sensor 129 and/or second supplementary sensor 128. A processing unit configured to control first and second physiological sensor 119, 129 to provide the sensor data in subsequent time intervals may thus comprise first processor 112 and/or second processor 122 and/or processor 182 of remote device 180.

Figure 5:
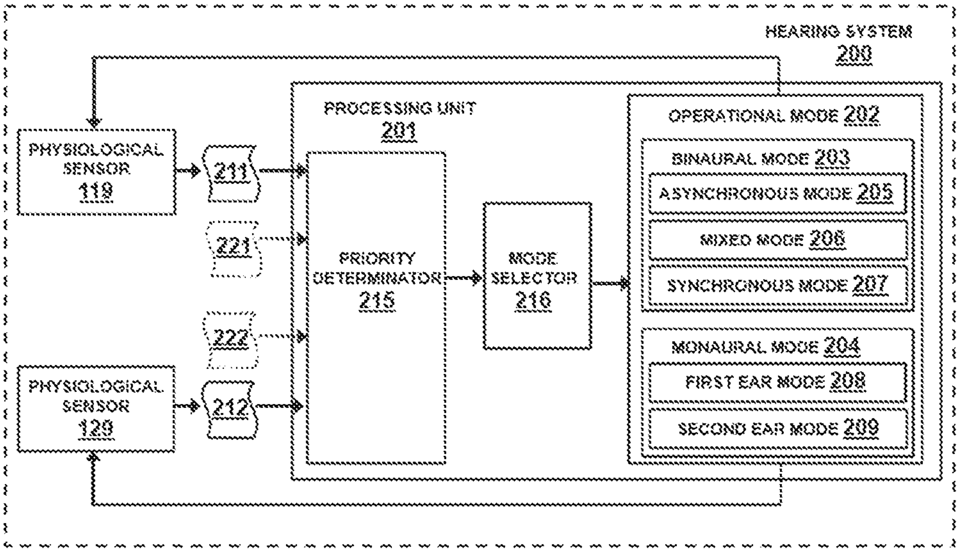
FIG. 5 schematically illustrates some exemplary configurations of the hearing system illustrated in FIGS. 1, 4 to control a physiological sensor included in each of the two hearing devices to provide sensor data to a processing unit.

FIG. 5 illustrates a functional block diagram of an exemplary hearing system 200 comprising first physiological sensor 119, second physiological sensor 129, and a processing unit 201 configured to control first and second physiological sensor 119, 129 to provide the sensor data to processing unit 201 in subsequent time intervals. For instance, hearing system 200 may be implemented by hearing system 100 illustrated in FIG. 1, or by hearing system 150 illustrated in FIG. 4. Processing unit 201 may be implemented by first processor 112 and/or second processor 122 and/or processor 182 of remote device 180, as described above. Processing unit 201 is configured to execute a control algorithm in which at least one of first and second physiological sensor 119, 129 is controlled to provide the sensor data to processing unit 201. As illustrated, the control algorithm comprises an operational mode module 202 in which the controlling of the first physiological sensor 119 and/or second physiological sensor 129 to provide the sensor data in subsequent time intervals is executed, a priority determination module 215, and an operational mode selection module 216.

Operational mode module 202 may be configured to execute a plurality of different operational modes in which the controlling of the first physiological sensor 119 and/or second physiological sensor 129 to provide the sensor data in subsequent time intervals can be executed. The operational modes may include at least one binaural operational mode 203 in which one of first and second physiological sensor 119, 129 is controlled to provide the sensor data in at least one of the subsequent time intervals, and the other of first and second physiological sensor 119, 129 is controlled to provide the sensor data at an equal time in said at least one time interval and/or in at least one other time interval of the subsequent time intervals than said at least one time interval.

Binaural operational mode 203 may include a fully asynchronous operational mode 205 in which first and second physiological sensor 119, 129 are controlled to alternatingly provide the sensor data to processing unit 201 in all of the subsequent time intervals. Thus, in each time interval of said subsequent time intervals, one of first and second physiological sensor 119, 129 may be controlled to provide the sensor data to processing unit 201 and the other of first and second physiological sensor 119, 129 may be controlled to abstain from providing the sensor data to processing unit 201, wherein first physiological sensor 119 is controlled to provide the sensor data in at least one of the subsequent time intervals, and second physiological sensor 129 is controlled to provide the sensor data in at least one other of the subsequent time intervals. An asynchronous operational mode, in which first and second physiological sensor 119, 129 are controlled to alternatingly provide the sensor data to processing unit 201 in two or more subsequent time intervals, may comprise fully asynchronous operational mode 205. E.g., in some implementations, the asynchronous operational mode may be provided as the fully asynchronous operational mode 205.

Binaural operational mode 203 may include a synchronous operational mode 207 in which first and second physiological sensor 119, 129 are controlled to simultaneously provide the sensor data at an equal time in all of said subsequent time intervals. Thus, in each time interval of the subsequent time intervals, both of first and second physiological sensor 119, 129 may be controlled to provide the sensor data to the processing unit.

Binaural operational mode 203 may include a mixed operational mode 206 in which one of first and second physiological sensor 119, 129 is controlled to provide the sensor data and the other of the first and second physiological sensor 119, 129 is controlled to abstain from providing the sensor data in at least one of the subsequent time intervals, and first and second physiological sensor 119, 129 are controlled to simultaneously provide the sensor data at an equal time in at least one other of the subsequent time intervals. Mixed mode 206 may comprise a mixed asynchronous and synchronous operational mode in which first and second physiological sensor 119, 129 are controlled to alternatingly provide the sensor data in at least two of the subsequent time intervals, in particular such that first physiological sensor 119 is controlled to provide the sensor data and second physiological sensor 129 is controlled to abstain from providing the sensor data in at least one of the subsequent time intervals, and second physiological sensor 129 is controlled to provide the sensor data and first physiological sensor 119 is controlled to abstain from providing the sensor data in at least one other of the subsequent time intervals, and first and second physiological sensor 119, 129 are controlled to simultaneously provide the sensor data at an equal time in at least one further of the subsequent time intervals. An asynchronous operational mode, in which first and second physiological sensor 119, 129 are controlled to alternatingly provide the sensor data to processing unit 201 in at least two or more subsequent time intervals, may comprise mixed operational mode 206. In some implementations, the asynchronous operational mode may comprise one or more mixed operational modes 206, in which the number and/or frequency of subsequent time intervals 231, 232 in which first and second physiological sensor 119, 129 are controlled to simultaneously provide sensor data 211, 212 is different. E.g., a first mixed operational mode 206 having a larger number and/or frequency of subsequent time intervals 231, 232 in which sensor data 211, 212 is simultaneously provided can be desirable to increase a quality of the sensor data 211, 212. A second mixed operational mode 206 having a smaller number and/or frequency of subsequent time intervals 231, 232 in which sensor data 211, 212 is simultaneously provided can be desirable to save battery power.

In some implementations, the asynchronous operational mode may comprise fully asynchronous operational mode 205 and at least one mixed operational mode 206. For instance, when the asynchronous operational mode comprises fully asynchronous operational mode 205 and mixed mode 206 and the first and second physiological sensor 119, 129 are controlled to operate in the fully asynchronous operational mode 205, the processing unit may be configured to change the first and second physiological sensor 119, 129 from operating in the fully asynchronous operational mode 205 into operating into the mixed mode 206. Vice versa, when the first and second physiological sensor 119, 129 are controlled to operate in the mixed mode 206, the processing unit may be configured to change from the fully asynchronous operational mode 205 into the mixed operational mode 206. E.g., changing from the fully asynchronous operational mode 205 into the mixed mode 206 can be advantageous when the sensor data provided by one or both of the first and second physiological sensor 119, 129 has a rather low quality. Changing from the mixed operational mode 206 into the fully asynchronous operational mode 205 can be advantageous to save battery power, e.g. when the sensor data provided by both of the first and second physiological sensor 119, 129 have a rather high quality. In some implementations, the asynchronous operational mode may comprise at least two mixed operational modes 206. The processing unit may then be configured to change the first and second physiological sensor 119 from operating in one of the mixed operational modes 206 into operating into another mixed operational mode 206. E.g., changing from a mixed operational mode 206 having a smaller number and/or frequency of subsequent time intervals 231, 232 in which sensor data 211, 212 is simultaneously provided into a mixed operational mode 206 having a larger number and/or frequency of subsequent time intervals 231, 232 in which sensor data 211, 212 is simultaneously provided can be desirable to improve an overall quality of the sensor data.

The operational modes may include at least one monaural operational mode 204 in which one of first and second physiological sensor 119, 129 is controlled to provide the sensor data to processing unit 201 in all of the subsequent time intervals, and the other of first and second physiological sensor 119, 129 is controlled to abstain from providing the sensor data to processing unit 201 in all of said subsequent time intervals. Monaural operational mode 204 may include a first ear operational mode 208 in which first physiological sensor 119 is controlled to provide the sensor data and second physiological sensor 129 is controlled to abstain from providing the sensor data to processing unit 201 in all of the subsequent time intervals. Monaural operational mode 204 may include a second ear operational mode 209 in which second physiological sensor 129 is controlled to provide the sensor data and first physiological sensor 119 is controlled to abstain from providing the sensor data to processing unit 201 in all of the subsequent time intervals.

In particular, processing unit 201 may be configured to control one of first and second physiological sensor 119, 129 to provide the sensor data to processing unit 201 and the other of first and second physiological sensor 119, 129 to abstain from providing the sensor data to processing unit 201 in at least one of the subsequent time intervals in asynchronous operational mode 205 and/or in mixed operational mode 206 and/or in monaural operational mode 204, in particular in first ear operational mode 208 and/or in second ear operational mode 209. Processing unit 201 may be configured to control first and second physiological sensor 119, 129 to alternatingly provide the sensor data to processing unit 201 in at least two of the subsequent time intervals in asynchronous operational mode 205 and/or in mixed operational mode 206, for instance in the mixed asynchronous and synchronous operational mode.

Processing unit 201 can thus be configured to control first and second physiological sensor 119, 129 to provide the sensor data in subsequent time intervals in one of operational modes 203-209 at a certain time, which may be executed by operational mode module 202 at that time. Priority determination module 215 is configured to determine, in the operational mode 203-209 which is currently executed, a priority parameter indicative of a priority of another operational mode 203-209 relative to the operational mode 203-209 which is currently executed.

For instance, when first and second physiological sensor 119, 129 are controlled to provide the sensor data in a binaural operational mode 203, in particular in asynchronous operational mode 205 or in mixed operational mode 206 or in synchronous operational mode 207, the priority parameter may be indicative of a priority of a monaural operational mode 204, in particular first ear operational mode 208 or second ear operational mode 209, relative to the binaural operational mode 203. As another example, when first and second physiological sensor 119, 129 are controlled to provide the sensor data in a binaural operational mode 203 in which one of first and second physiological sensor 119, 129 is controlled to provide the sensor data to processing unit 201 and the other of first and second physiological sensor 119, 129 to abstain from providing the sensor data to processing unit 201 in at least one of the subsequent time intervals, in particular in asynchronous operational mode 205 or in mixed operational mode 206, the priority parameter may be indicative of a priority of a monaural operational mode 204, in particular first ear operational mode 208 or second ear operational mode 209, relative to said binaural operational mode 203 or the priority parameter may be indicative of a priority of synchronous operational mode 207 relative to said binaural operational mode 203. As a further example, when first and second physiological sensor 119, 129 are controlled to provide the sensor data in synchronous operational mode 207, the priority parameter may be indicative of a priority of asynchronous operational mode 205 or a priority of mixed operational mode 206 or a priority of a monaural operational mode 204 relative to the synchronous operational mode 207. As yet another example, when first and second physiological sensor 119, 129 are controlled to provide the sensor data in first ear operational mode 208, the priority parameter may be indicative of a priority of second ear operational mode 208 relative to first ear operational mode 208 or a priority of a binaural operational mode 203 relative to first ear operational mode 208.

To illustrate, when first and second physiological sensor 119, 129 are controlled to provide the sensor data in an asynchronous operational mode, e.g. in fully asynchronous operational mode 205 or in mixed operational mode 206, the priority parameter may be indicative of a priority of a monaural operational mode 204 when a quality of the sensor data provided by one of first and second physiological sensor 119, 129 is determined to be rather low such that the sensor data shall only be provided by the other of first and second physiological sensor 119, 129 in all the subsequent time intervals and/or when a charging status of a battery constituting a power source of one of first and second physiological sensor 119, 129 is determined to be rather low such that the sensor data shall only be provided by the other of first and second physiological sensor 119, 129 in all the subsequent time intervals to save power of the battery. To further illustrate, when first and second physiological sensor 119, 129 are controlled to provide the sensor data in an asynchronous operational mode 205, 206, the priority parameter may be indicative of a priority of synchronous operational mode 207 when a quality of the sensor data provided by both the first and second physiological sensor 119, 129 is determined to be rather low such that the sensor data shall be provided simultaneously by first and second physiological sensor 119, 129 at an equal time in all of the subsequent time intervals. The sensor data simultaneously provided by first and second physiological sensor 119, 129 may then be combined and/or evaluated together by taking into account the sensor data provided by the first and second physiological sensor 119, 129 at an equal time to improve the overall quality of the sensor data, in particular by exploiting a redundancy of the sensor data provided at both ears. As another example, when first and second physiological sensor 119, 129 are controlled to provide the sensor data in fully asynchronous operational mode 205, the priority parameter may be indicative of a priority of a mixed operational mode 206 when a quality of the sensor data provided by one of first and second physiological sensor 119, 129 is determined to be moderate or fair such that the sensor data shall alternatively be provided by the first and second physiological sensor 119, 129 in at least two subsequent time intervals and the sensor data shall simultaneously be provided by the first and second physiological sensor 119, 129 in at least another subsequent time interval. Thus, by taking into account the sensor data provided at the equal time, the quality of the sensor data may be sufficiently improved, and by alternatively providing the sensor data in other subsequent time intervals, battery power can be saved. As a further example, when first and second physiological sensor 119, 129 are controlled to provide the sensor data in mixed operational mode 206, the priority parameter may be indicative of a priority of fully asynchronous operational mode 205 when a quality of the sensor data provided by one of first and second physiological sensor 119, 129 is determined to be very high such that the alternatingly provided sensor data can account for a desired quality and a reduction of battery consumption. As yet another example, when first and second physiological sensor 119, 129 are controlled to provide the sensor data in synchronous operational mode 207, the priority parameter may be indicative of a priority of mixed operational mode 206 when a quality of the sensor data provided by one of first and second physiological sensor 119, 129 is determined to be moderate or fair such that the sensor data shall alternatively be provided by the first and second physiological sensor 119, 129 in at least two subsequent time intervals and the sensor data shall simultaneously be provided by the first and second physiological sensor 119, 129 in at least another subsequent time interval. As still a further example, when first and second physiological sensor 119, 129 are controlled to provide the sensor data in a first mixed operational mode 206 having a smaller number and/or frequency of subsequent time intervals 231, 232 in which sensor data 211, 212 is simultaneously provided, the priority parameter may be indicative of a priority of a second mixed operational mode 206 having a larger number and/or frequency of subsequent time intervals 231, 232 in which sensor data 211, 212 is simultaneously provided when a quality of the sensor data provided by one of first and second physiological sensor 119, 129 is determined to be too low such that the increased number and/or frequency of subsequent time intervals 231, 232 in which sensor data 211, 212 is simultaneously provided can account for a better quality of the sensor data 211, 212.

By operational mode selection module 216, processing unit 201 is configured to change, depending on the priority parameter, operational mode 203-209 in which first and second physiological sensor 119, 129 are controlled to provide the sensor data in subsequent time intervals. Thus, operational mode 203-209 currently executed by operational mode module 202 can be changed to another operational mode 203-209. In particular, when the priority parameter indicates a priority of another operational mode 203-209 relative to the currently executed operational mode 203-209, processing unit 201 is configured to change from the currently executed operational mode 203-209 to the other operational mode 203-209.

For example, when first and second physiological sensor 119, 129 are controlled to provide the sensor data in a binaural operational mode 203, processing unit 201 can be configured to change, when the priority parameter indicates a priority of a monaural operational mode 204 relative to the binaural operational mode, from the binaural operational mode to the monaural operational mode. As another example, when first and second physiological sensor 119, 129 are controlled to provide the sensor data in a binaural operational mode 203 in which one of first and second physiological sensor 119, 129 is controlled to provide the sensor data to processing unit 201 and the other of first and second physiological sensor 119, 129 to abstain from providing the sensor data to processing unit 201 in at least one of the subsequent time intervals, in particular in asynchronous operational mode 205 or in mixed operational mode 206, processing unit 201 can be configured to change, when the priority parameter indicates a priority of a monaural operational mode 204 relative to said binaural operational mode, from the binaural operational mode to the monaural operational mode and/or when the priority parameter indicates a priority of synchronous operational mode 207 relative to said binaural operational mode, from said binaural operational mode to the synchronous operational mode 207.

According to one of operational modes 203-209 executed by operational mode module 202, first physiological sensor 119 can be controlled to provide sensor data 211 and/or second physiological sensor 119, 129 can be controlled to provide sensor data 212 in the subsequent time intervals. Sensor data 211 provided by first physiological sensor 119 is referred to as first physiological sensor data. Sensor data 212 provided by second physiological sensor 129 is referred to as second physiological sensor data.

In some implementations, as illustrated, first physiological sensor data 211 and second physiological sensor data 212 can be inputted to priority determination module 215. Priority determination module 215 can then be configured to determine the priority parameter depending on first physiological sensor data 211 and second physiological sensor data 212. In some instances, priority determination module 215 can be configured to determine a first quality measure indicative of a quality of first physiological sensor data 211, and a second quality measure indicative of a quality of second physiological sensor data 212. In particular, the first quality measure may be determined based on first physiological sensor data 211, and the second quality measure may be determined based on second physiological sensor data 212. For example, the first quality measure may be determined based on a signal-to-noise ratio of first physiological sensor data 211, and the second quality measure may be determined based on a signal-to-noise ratio of second physiological sensor data 212. As another example, when first and second physiological sensor 119, 129 are implemented as an optical sensor each comprising a light source and a photodetector configured to detect light emitted from the light source, the first quality measure may be determined based on light detected by the photodetector of first physiological sensor 119 which is unrelated to the light emitted from the light source of first physiological sensor 119, for instance light detected by the photodetector having a different wavelength than the light emitted from the light source, and the second quality measure may be determined based on light detected by the photodetector of second physiological sensor 129 which is unrelated to the light emitted from the light source of second physiological sensor 129.

Priority determination module 215 can then be configured to determine the priority parameter depending on the first quality measure and the second quality measure. For example, when one of the first quality measure and the second quality measure is indicative of a rather low quality of one of first and second physiological sensor data 211, 212, the priority parameter may be determined to indicate a priority of a monaural operational mode 204 relative to a binaural operational mode 203, in which monaural operational mode the other of first and second physiological sensor data 211, 212 is provided in all subsequent time intervals. As another example, when both the first quality measure and the second quality measure are indicative of a rather low quality of first and second physiological sensor data 211, 212, the priority parameter may be determined to indicate a priority of synchronous operational mode 207 relative to asynchronous operational mode 205 and/or mixed operational mode 206.

In some implementations, as also illustrated, supplementary data 221, 222 different from first and second physiological sensor data 211, 212 can be inputted to priority determination module 215. Supplementary data 221, 222 may comprise first supplementary data 221 acquired by first hearing device 110, 160, for instance by first processor 112, and second supplementary data 222 acquired by second hearing device 120, 170, for instance by second processor 122. Priority determination module 215 can then be configured to determine the priority parameter depending on first supplementary data 221 and second supplementary data 222.

In some implementations, first supplementary data 221 may be provided as sensor data provided by first supplementary sensor 118, subsequently referred to as first supplementary sensor data, and second supplementary data 222 may be provided as sensor data provided by second supplementary sensor 128, subsequently referred to as second supplementary sensor data. Priority determination module 215 can then be configured to determine the priority parameter depending on first supplementary sensor data 221 and second supplementary sensor data 222. In some instances, priority determination module 215 can be configured to determine the first quality measure indicative of the quality of first physiological sensor data 211 based on first supplementary sensor data 221, and the second quality measure indicative of the quality of second physiological sensor data 212 based on second supplementary data 222.

For example, first and second supplementary sensor 118, 128 may each be implemented as temperature sensor 134, 138 configured to detect a temperature and to provide sensor data indicative of the detected temperature. The first quality measure may then be determined based on the temperature detected by first supplementary sensor 118, and the second quality measure may then be determined based on the temperature detected by second supplementary sensor 128. To illustrate, a rather high temperature detected in the environment and/or on the user may indicate a lower quality of first and/or second physiological sensor data 211, 212 depending on whether the rather high temperature has been detected in first hearing device 110, 160 in which first physiological sensor 119 is included and/or in second hearing device 120, 170 in which second physiological sensor 129 is included. In particular, the temperature detected by supplementary sensor 118, 128 may indicate a heating of the respective hearing device 110, 120, 160, 170 in which supplementary sensor 118, 128 is included. For instance, such a heating may be caused by sunlight shining particularly strongly on one ear on one side of the user's head as compared to the other ear on the opposing side of the user's head.

As another example, first and second supplementary sensor 118, 128 may each be implemented as movement sensor 132 configured to detect a movement of the respective hearing device 110, 120, 160, 170 in which supplementary sensor 118, 128 is included, and to provide sensor data indicative of the detected movement. The first quality measure may be determined based on the movement detected by first supplementary sensor 118, and the second quality measure may be determined based on the movement detected by second supplementary sensor 128. To illustrate, a movement of hearing device 110, 120, 160, 170 may indicate a lower quality of first and/or second physiological sensor data 211, 212 depending on whether the movement has been detected in first hearing device 110, 160 in which first physiological sensor 119 is included and/or in second hearing device 120, 170 in which second physiological sensor 129 is included. In particular, the movement of hearing device 110, 120, 160, 170 can produce movement artefacts in first and second physiological sensor data 211, 212. For instance, when the user is walking or running, corresponding movements of hearing device 110, 120, 160, 170 worn by the user can degrade first and second physiological sensor data 211, 212. The degree of degradation, however, may vary in first hearing device 110, 160 in which first physiological sensor 119 is included as compared to second hearing device 120, 170 in which second physiological sensor 129 is included, for instance depending on a fitting of the respective hearing device at the ear or in the ear at which the hearing device is worn.

In some implementations, first supplementary data 221 may comprise information about a charging status of a first battery included in first hearing device 110, 160 in which first physiological sensor 119 is included, and second supplementary data 222 may comprise information about a charging status of a second battery included in second hearing device 120, 170 in which second physiological sensor 129 is included. For instance, the first and second battery may each be implemented as battery 145 as illustrated in FIG. 3. Priority determination module 215 can then be configured to determine the priority parameter depending on the charging status of the first battery and the charging status of the second battery. For example, when a low charging status of one of the first and second battery has been identified, the priority parameter may be determined to indicate a priority of a monaural operational mode 204 relative to a binaural operational mode 203, in which monaural operational mode the sensor data is provided by physiological sensor 119, 129 included in the other hearing device than the hearing device which includes the battery with the low charging status.

In some implementations, first supplementary data 221 may comprise sensor data provided by first supplementary sensor 118 and information about a charging status of the first battery included in first hearing device 110, 160, and second supplementary data 222 may comprise sensor data provided by second supplementary sensor 128 and information about a charging status of the second battery included in second hearing device 120, 170. Priority determination module 215 can then be configured to determine the priority parameter depending on both the sensor data provided by first and second supplementary sensor 118, 128, in particular the first quality and second quality measure determined therefrom, and the charging status of the first battery and second battery.

FIGS. 6-11 illustrate different operational modes in which processing unit 201 illustrated in FIG. 5 can control first physiological sensor 119 implemented in first hearing device 110, 160 and second physiological sensor 129 implemented in second hearing device 120, 170 to provide sensor data 211, 212 to processing unit 112, 122 in subsequent time intervals 231, 232. Each of first physiological sensor 119 and second physiological sensor 129 may be implemented as one of physiological sensors 131-134 illustrated in FIG. 2, or any other physiological sensor.

Figure 6:
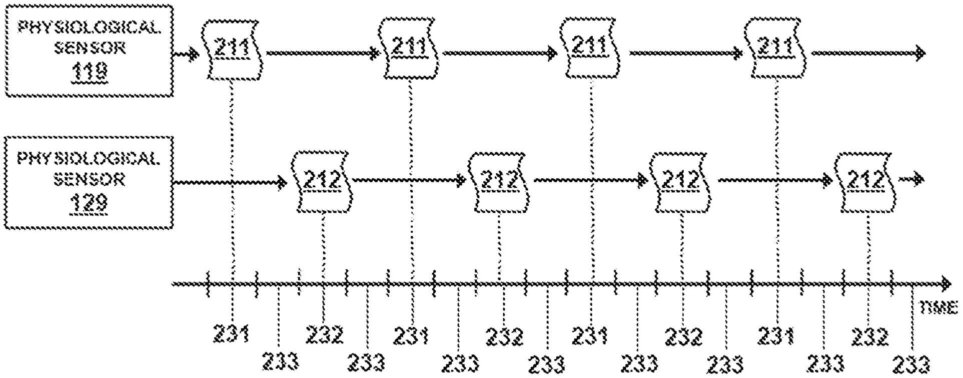
FIGS. 6-11 schematically illustrate different operational modes in which a processing unit included in the hearing system illustrated in FIG. 1 can control a first and second physiological sensor.

FIG. 6 illustrates a binaural operational mode in which first physiological sensor 119 is controlled to provide sensor data 211 during a first time interval 231, and second physiological sensor 129 is controlled to provide sensor data 212 during a second time interval 232 after first time interval 231. During first time interval 231, second physiological sensor 129 is controlled to abstain from providing sensor data 212. During second time interval 232, first physiological sensor 119 is controlled to abstain from providing sensor data 211. Sensor data 211, 212 is thus alternatingly provided by first physiological sensor 119 and second physiological sensor 129 in subsequent time intervals 231, 232. Those control operations may be performed in some implementations of fully asynchronous operational mode 205. An asynchronous operational mode, in which one of the first and second physiological sensor is controlled to provide the sensor data to the processing unit in at least one of the subsequent time intervals, and the other of the first and second physiological sensor is controlled to abstain from providing the sensor data in the same subsequent time interval, may comprise the fully asynchronous operational mode 205.

The control operations performed in first time interval 231 and second time interval 232 are repeated in a recurring sequence. In the illustrated example, the control operations performed in first time interval 231 are temporally followed by the control operations performed in second time interval 232, which are temporally followed by the control operations performed in first time interval 231, which are again temporally followed by the control operations performed in second time interval 232. An intermediate time interval 233 is provided between each of two consecutive time intervals 231, 232 in the temporal sequence. Intermediate time interval 233 is thus provided between first time interval 231 and second time interval 232, and between second time interval 232 and first time interval 231 in the recurring sequence. During intermediate time interval 233, first and second physiological sensor 119, 129 are both controlled to abstain from providing the sensor data to the processing unit.

Figure 7:
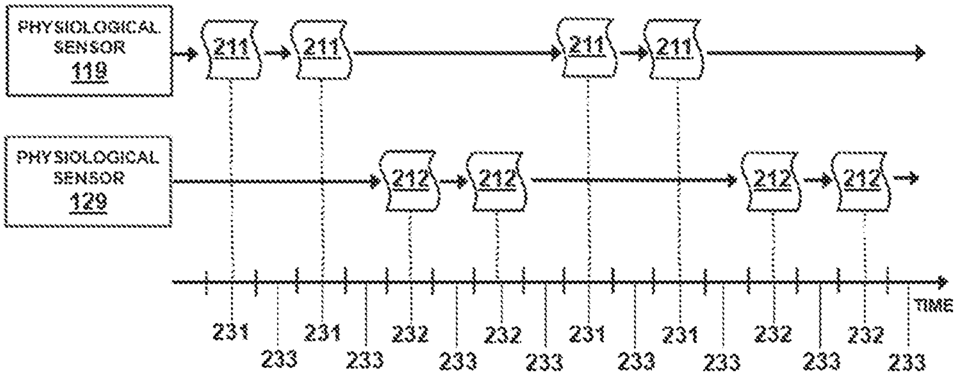

FIG. 7 illustrates another binaural operational mode in which first physiological sensor 119 is controlled to provide sensor data 211 and second physiological sensor 129 is controlled to abstain from providing sensor data 212 during first time interval 231, and second physiological sensor 129 is controlled to provide sensor data 212 and first physiological sensor 119 is controlled to abstain from providing sensor data 211 during second time interval 232. The control operations performed in first time interval 231 and second time interval 232 are repeated in a recurring sequence different from the sequence illustrated in FIG. 6. In the example illustrated in FIG. 7, the control operations performed in first time interval 231 are temporally followed again by the control operations performed in first time interval 231, which are then temporally followed by the control operations performed in second time interval 232, which are again temporally followed by the control operations performed in second time interval 232. Those control operations may be performed in some implementations of fully asynchronous operational mode 205. More generally, the control operations performed in first time interval 231 may be repeated for a predetermined number of times in a predetermined number of consecutive first time intervals 231 in the temporal sequence, and subsequently the control operations performed in second time interval 232 may be repeated for a predetermined number of times in a predetermined number of consecutive second time intervals 232 in the temporal sequence.

In each of the binaural operational modes illustrated in FIGS. 6 and 7, one of first and second physiological sensor 119, 129 is controlled to provide sensor data 211, 212 to the processing unit and the other of first and second physiological sensor 119, 129 is controlled to abstain from providing sensor data 211, 212 to the processing unit in all of subsequent time intervals 231, 232 in the recurring sequence. Those control operations may be performed by processing unit 201 in fully asynchronous operational mode 205. The asynchronous operational mode may be implemented as some embodiments of binaural operational mode 203. Processing unit 201 may be configured to execute binaural operational mode 203 as fully asynchronous operational mode 205 and/or or another binaural operational mode, as further illustrated below.

Figure 8:
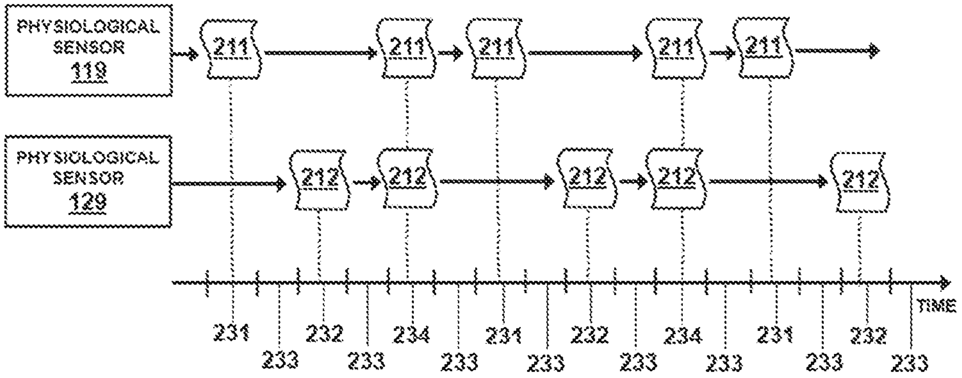

FIG. 8 illustrates another binaural operational mode in which first physiological sensor 119 is controlled to provide sensor data 211 and second physiological sensor 129 is controlled to abstain from providing sensor data 212 during first time interval 231, and second physiological sensor 129 is controlled to provide sensor data 212 and first physiological sensor 119 is controlled to abstain from providing sensor data 211 during second time interval 232. The temporal sequence further comprises a third time interval 234 in which first physiological sensor 119 and second physiological sensor 129 are controlled to simultaneously provide sensor data 211, 212 to the processing unit at an equal time in third time interval 234. Sensor data 211, 212 is thus asynchronously provided by first and second physiological sensors 119, 129 in time intervals 231, 232, and synchronously provided by first and second physiological sensors 119, 129 in third time interval 234. Those control operations may be performed in some implementations of mixed operational mode 206. In the mixed operational mode 206, processing unit 201 may be configured to control first and second physiological sensor 119, 129 in a partly synchronous mode during at least one of the subsequent time intervals, and in a partly asynchronous operational mode during at least one other of the subsequent time intervals. An asynchronous operational mode, in which one of the first and second physiological sensor is controlled to provide the sensor data to the processing unit in at least one of the subsequent time intervals, and the other of the first and second physiological sensor is controlled to abstain from providing the sensor data in the same subsequent time interval, may comprise the mixed operational mode 206. In some implementations, the asynchronous operational mode may comprise one or more mixed operational modes 206, in which the number and/or frequency of subsequent time intervals 231, 232 in which first and second physiological sensor 119, 129 are controlled to simultaneously provide sensor data 211, 212 is different. In some implementations, the asynchronous operational mode may comprise fully asynchronous operational mode 205 and at least one mixed operational mode 206.

In some implementations, third time interval 234 is employed to control first physiological sensor 119 and second physiological sensor 129 to simultaneously provide sensor data 211, 212 to processing unit 201 at the equal time to determine the first quality measure and the second quality measure based on first physiological sensor data 211 and second physiological sensor data 212 provided at the equal time.

The control operations performed in first time interval 231, second time interval 232, and third time interval 234 are repeated in a recurring sequence. In the illustrated example, the control operations performed in first time interval 231 are temporally followed by the control operations performed in second time interval 232, which are temporally followed by the control operations performed in third time interval

234, which are again temporally followed by the control operations performed in first time interval 231, which are again temporally followed by the control operations performed in second time interval 232, which are again temporally followed by the control operations performed in third time interval 234. Intermediate time interval 233 is provided between each of two consecutive time intervals 231, 232, 233 in the temporal sequence.

In some implementations, time interval 231 and/or time interval 232, during which the controlling of one of first and second physiological sensor 119, 129 to provide sensor data 211, 212 and the other of first and second physiological sensor 119, 129 to abstain from providing sensor data 211, 212 is controlled, is repeated more often in the subsequent time intervals than time interval 234, during which the controlling of first and second physiological sensor 119, 129 to simultaneously provide sensor data 211, 212 is controlled. In some instances, first time interval 231 and/or second time interval 232 is repeated at least two times more often in the subsequent time intervals than time interval 234. In some instances, first time interval 231 and/or second time interval 232 is repeated at least ten times more often in the subsequent time intervals than time interval 234. In this way, the power required for operating first and second physiological sensor 119, 129 may be advantageously reduced during first and/or second time interval 231, 232. Nevertheless, a desired quality of sensor data 211, 212 may be ensured by determining the first and second quality measure, for instance based on sensor data 211, 212 provided at the equal time during third time interval 234, which can then be repeated less often than first and/or second time interval 231, 232.

Figure 9:
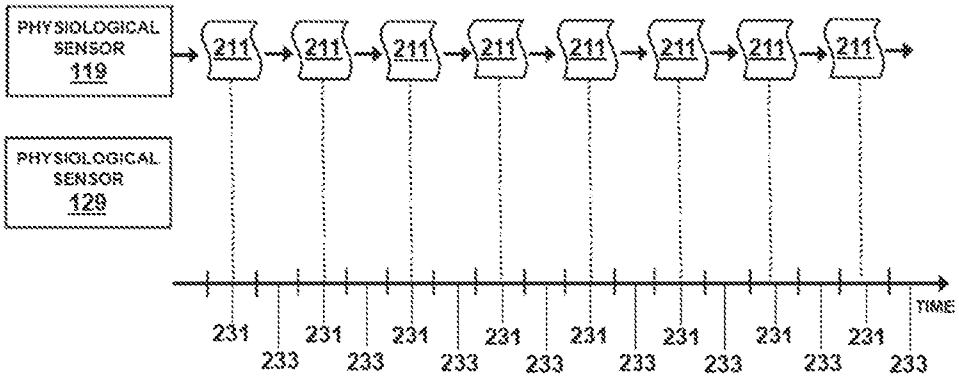
Figure 10:
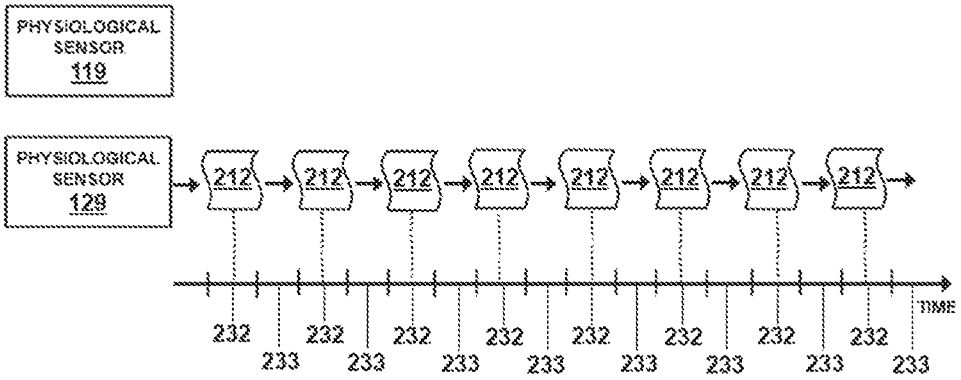

FIGS. 9 and 10 each illustrate a respective monaural operational mode in which one of the first and second physiological sensor 119, 129 is controlled to provide sensor data 211, 212 to the processing unit in all subsequent time intervals, and the other of first and second physiological sensor 119, 129 is controlled to abstain from providing sensor data 211, 212 to the processing unit in all subsequent time intervals. In the monaural operational mode illustrated in FIG. 9, first time interval 231 is repeatedly provided in the temporal sequence separated by intermediate time interval 233. First physiological sensor 119 is thus controlled to provide sensor data 211 and second physiological sensor 129 is controlled to abstain from providing sensor data 212 in each first time interval 231 in the temporal sequence of first time intervals 231. Those control operations may be performed in some implementations of first ear operational mode 208. In the monaural operational mode illustrated in FIG. 10, second time interval 232 is repeatedly provided in the temporal sequence separated by intermediate time interval 233. Second physiological sensor 129 is thus controlled to provide sensor data 212 and second physiological sensor 129 is controlled to abstain from providing sensor data 211 in each second time interval 232 in the temporal sequence of second time intervals 232. Those control operations may be performed in some implementations of second ear operational mode 209.

Figure 11:
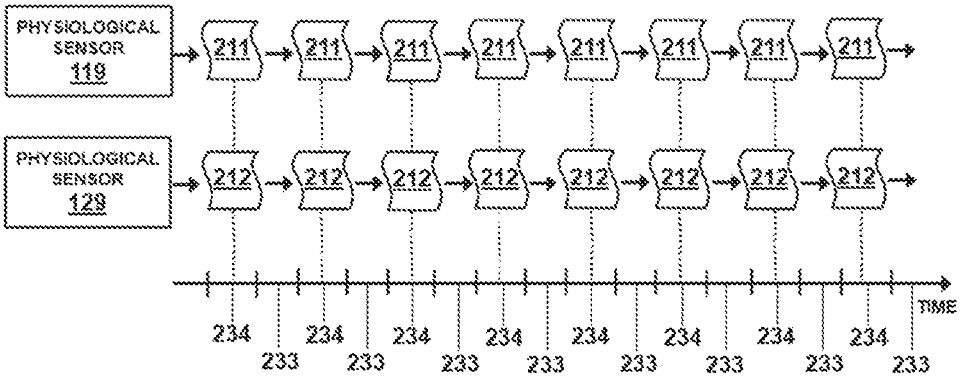

FIG. 11 illustrates a binaural operational mode, in which first and second physiological sensor 119, 129 are controlled to simultaneously provide sensor data 211, 212 to the processing unit at an equal time in all subsequent time intervals. In the illustrated example, third time interval 234 is repeatedly provided in the temporal sequence separated by intermediate time interval 233. First and second physiological sensor 119, 129 are thus controlled to simultaneously provide sensor data 211, 212 to the processing unit at an equal time in each third time interval 234 in the temporal sequence of third time intervals 234. Those control operations may be performed in some implementations of synchronous operational mode 208. The processing unit may be configured to execute the binaural operational mode as asynchronous operational mode 205, as exemplified in FIGS. 6 and 7, and/or mixed mode 206, as exemplified in FIG. 8, and/or synchronous operational mode 207, as exemplified in FIG. 11.

Figure 12:
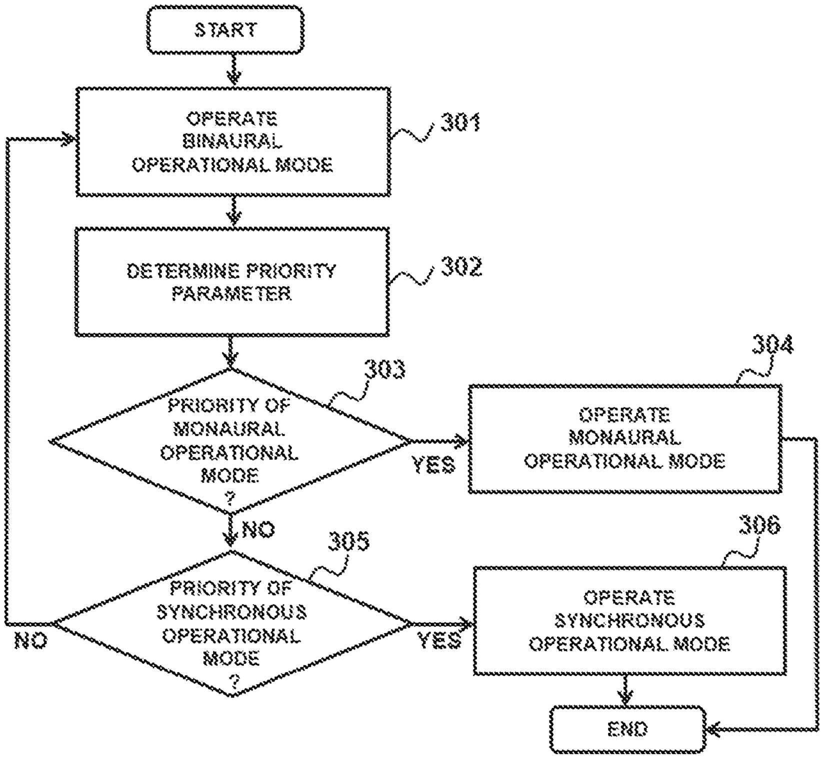
FIGS. 12-15 illustrate some exemplary methods of operating a hearing system according to principles described herein.

FIG. 12 illustrates a block flow diagram for an exemplary method of operating hearing system 100. The method may be executed by processing unit 112, 122. At 301, a binaural operational mode is operated in which first and second physiological sensor 119, 129 are controlled to provide sensor data 211, 212 in subsequent time intervals, wherein, in at least one of the subsequent time intervals, one of first and second physiological sensor 119, 129 is controlled to provide sensor data 211, 212 to the processing unit and the other of first and second physiological sensor 119, 129 is controlled to abstain from providing sensor data 211, 212 to the processing unit. For instance, the binaural operational mode may be implemented as asynchronous operational mode 205 or mixed operational mode 206, as exemplified in any of FIGS. 6-8. At 302, when the processing unit is in the binaural operational mode according to operation 301, a priority parameter is determined. The priority parameter can be indicative of a priority of a monaural operational mode 204 relative to the binaural operational mode. The priority parameter can also be indicative of a priority of synchronous operational mode 207 relative to the binaural operational mode executed in operation 301, which may be asynchronous operational mode 205 or mixed operational mode 206.

At 303, it is determined, based on the priority parameter, whether a monaural operational mode has priority relative to the binaural operational mode. When such a priority of the monaural operational mode has been determined, the operational mode is changed at 304 from the binaural operational mode to a monaural operational mode 204 in which one of first and second physiological sensor 119, 129 is controlled to provide sensor data 211, 212 to the processing unit in all subsequent time intervals, and the other of first and second physiological sensor 119, 129 is controlled to abstain from providing sensor data 211, 212 to the processing unit in all subsequent time intervals. For instance, the monaural operational mode may be implemented as illustrated in any of FIGS. 9 and 10. In the contrary case, at 305, it is determined, based on the priority parameter, whether synchronous operational mode 207 has priority relative to the binaural operational mode which is currently operated, according to operation 301, in asynchronous operational mode 205 or mixed operational mode 206. When such a priority of the synchronous operational mode has been determined, the operational mode is changed at 305 to synchronous operational mode 207 in which in which first and second physiological sensor 119, 129 are controlled to simultaneously provide sensor data 211, 212 to the processing unit at an equal time in all subsequent time intervals. For instance, the synchronous operational mode may be implemented as illustrated in FIG. 11. In the contrary case, asynchronous operational mode 205 or mixed operational mode 206 is continued to be operated at 301.

Figure 13:
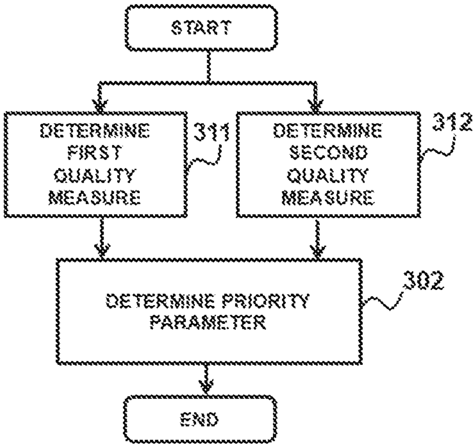

FIG. 13 illustrates a block flow diagram for an exemplary method of determining the priority parameter in the method illustrated in FIG. 12. The method may be executed by processing unit 112, 122. At 311, a first quality measure is determined, the first quality measure indicative of a quality of sensor data 211 provided by first physiological sensor 119. At 312, a second quality measure is determined, the second quality measure indicative of a quality of sensor data 212 provided by second physiological sensor 129. For instance, the first quality measure may be determined based on sensor data 211 provided by first physiological sensor 119 during first time interval 231 and/or during third time interval 234. The second quality measure may be determined based on sensor data 212 provided by second physiological sensor 129 during second time interval 232 and/or during third time interval 234. In some instances, the first quality measure may be determined after each first time interval 231 and/or after each third time interval 234 in the temporal sequence. The second quality measure may also be determined after each second time interval 232 and/or after each third time interval 234 in the temporal sequence. In some instances, the first and second quality measure may be determined based on sensor data 211 simultaneously provided by first and second physiological sensor 119, 129 at an equal time during third time interval 234. The first quality measure may also be determined based on sensor data provided by first supplementary sensor 118 which may be provided supplementary to first physiological sensor 119. The second quality measure may also be determined based on sensor data provided by second supplementary sensor 128 which may be provided supplementary to second physiological sensor 129. In some instances, the first and second quality measure may then be determined independently from sensor data 211, 212 provided by first and second physiological sensor 119, 129 in the temporal sequence. Based on the first quality measure and the second quality measure, the priority parameter is determined at 302.

Figure 14:
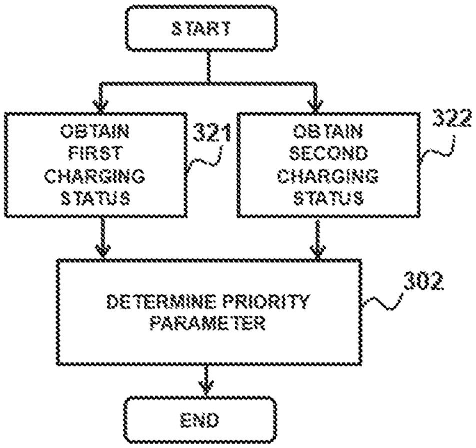

FIG. 14 illustrates another block flow diagram for an exemplary method of determining the priority parameter in the method illustrated in FIG. 12. The method may be executed by processing unit 112, 122. At 321, information about a charging status of a first battery included in first hearing device 110 is obtained. At 322, information about a charging status of a second battery included in second hearing device 120 is obtained. Based on the charging status of the first and second battery, the priority parameter is determined at 302.

Figure 15:
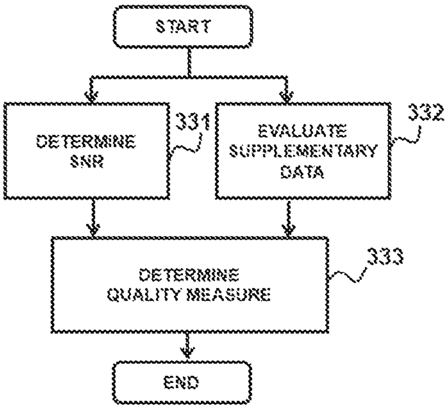

FIG. 15 illustrates a block flow diagram for an exemplary method of determining one of the first and second quality measure in the method illustrated in FIG. 12. The other of the first and second quality measure may be determined correspondingly. The method may be executed by processing unit 112, 122, in particular by priority determination module 215. At 331, a signal to noise ratio (SNR) of sensor data 211, 212 provided by one of first and second physiological sensor 119, 129 is determined. Additionally or alternatively, at 332, supplementary data 221, 222 different from first and second physiological sensor data 211, 212 can be evaluated. Supplementary data 221, 222 may be provided as sensor data provided by one of first and second supplementary sensor 118, 128. Supplementary data 221, 222 may also be provided as information regarding a charging status of battery 145. At 333, the quality measure can be determined based on the SNR determined in operation 331 and/or the supplementary data evaluated in operation 332. One of operation 311 of determining the first quality measure and operation 312 of determining the second quality measure in the method illustrated in FIG. 13 may be implemented corresponding to operation 333. The other of operation 311 and operation 312 may be also be implemented corresponding to operation 333, wherein operation 331 is also performed correspondingly by determining the SNR of sensor data 211, 212 provided by the other of first and second physiological sensor 119, 129 and/or operation 332 is also performed correspondingly based on supplementary data 221, 222 provided by the hearing device in which the other of first and second physiological sensor 119, 129 is included.

Figure 16:
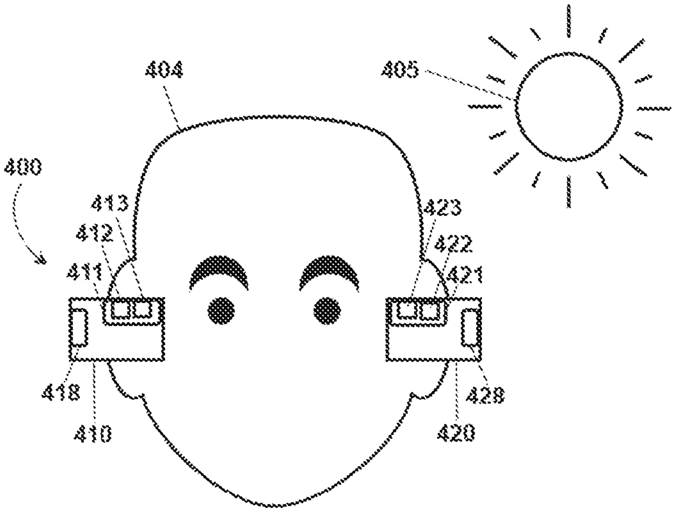
FIGS. 16, 17 illustrate some usage situations in which a hearing system can be operated according to principles described herein.

FIG. 16 illustrates a hearing system 400 worn by a user 404 in a usage situation in which sun 405 is shining on user 404. Hearing system 400 comprises a first hearing device 410 worn at a first ear of user 404, and a second hearing device 420 worn at a second ear of user 404. First hearing device 410 may be implemented as first hearing device 110, 160 of any hearing system 100, 150 illustrated in FIGS. 1 and 4. Second hearing device 420 may be implemented as second hearing device 120, 170 of any hearing system 100, 150 illustrated in FIGS. 1 and 4. First hearing device 410 comprises a first optical sensor 411 configured to provide sensor data 211 indicative of a physiological property of user 404, and second hearing device 420 comprises a second optical sensor 421 configured to provide sensor data 212 indicative of the same physiological property of user 404 as sensor data 211 provided by first optical sensor 411. In any of hearing system 100, 150, 200, first physiological sensor 119 may be implemented as first optical sensor 411, and second physiological sensor 129 may be implemented as second optical sensor 421. In particular, each of optical sensor 411, 421 may be implemented as optical sensor 131 illustrated in FIG. 2.

Each optical sensor 411, 421 comprises a light source 412, 422 and a photodetector 413, 432. Light source 412, 422 is configured to emit light toward tissue at the respective ear at which hearing device 410, 420 is worn, and photodetector 413, 423 is configured to detect a part of the emitted light returning from the tissue, in particular a part of the emitted light scattered by the tissue. For instance, sensor data 211, 212 provided by each optical sensor 411, 412 may be indicative of an intensity of the light detected by photodetector 413, 423, in particular at a wavelength of the light emitted by light source 412, 422. The detected intensity can indicate an amount of the light absorbed by the tissue. Thus, sensor data 211, 212 can be indicative of a presence of an analyte contained in the tissue which is absorbing the emitted light at a particular wavelength characteristic for the analyte. For instance, the analyte may be blood flowing through the tissue. Sensor data 211, 212 can thus be indicative of a property of the blood, in particular hemoglobin, flowing through the tissue. Such a blood property may include a heart rate and/or a blood pressure and/or a heart rate variability (HRV) and/or an oxygen saturation index (SpO2) and/or a maximum rate of oxygen consumption (VO2max). Sensor data 211, 212 may also be indicative of a presence of another analyte contained in the tissue, for instance water and/or lipid and/or glucose.

Each optical sensor 411, 421 may be implemented as a PPG sensor. Sensor data 211, 212 provided by each PPG sensor 411, 412 may then be PPG data, in particular a PPG waveform. The PPG data may indicate blood volume changes in the tissue at the ear over time. The PPG data may comprise a pulsatile physiological waveform, subsequently referred to as an AC component, which can be attributed to cardiac synchronous changes in the blood volume with each heart beat. The AC component of the PPG data may be superimposed by a slowly varying CDC") baseline with various lower frequency components, subsequently referred to as a DC component, which can be attributed to respiration and/or a sympathetic nervous system activity and/or thermoregulation. In some implementations, the quality measure determined based on sensor data 211, 212, in particular the first quality measure determined in operation 311 and/or the second quality measure determined in operation 312, can be indicative of a ratio of the AC component of the PPG data relative to the DC component of the PPG data. A higher value of this ratio, which may indicate a larger contribution of the AC component relative to the DC component in the PPG data, may indicate a higher quality of sensor data 211, 212. A lower value of this ratio, which may indicate a smaller contribution of the AC component relative to the DC component in the PPG data, may indicate a lower quality of sensor data 211, 212.

Sunlight emitted by sun 405 is impinging on user 404. The sunlight can disturb a measurement of the physiological property performed by optical sensor 411, 421, in particular by adding light detectable by photodetector 413, 423 of each optical sensor 411, 421 which is unrelated to the light emitted by light sources 412, 422. The quality of sensor data 211, 212 provided by optical sensor 411, 421 may thus be reduced by the added detected sunlight. In some implementations, the quality measure determined based on sensor data 211, 212, in particular the first quality measure determined in operation 311 and/or the second quality measure determined in operation 312, can be indicative of light detected by photodetector 413, 423 which is unrelated to the light emitted by the respective light source 412, 422. For instance, the first quality measure may be based on light detected by photodetector 413 of first optical sensor 411 at a wavelength different from a wavelength of the light emitted by light source 412 of first optical sensor 411, and the second quality measure may be based on light detected by the photodetector 423 of second optical sensor 421 at a wavelength different from a wavelength of the light emitted by light source 422 of second optical sensor 421.

In some implementations, first and second hearing device 410, 420 each comprise an environmental sensor 418, 428. In any of hearing system 100, 150, 200, first supplementary sensor 118 may be implemented as environmental sensor 418 of first hearing device 410, subsequently referred to as a first environmental sensor, and second supplementary sensor 128 may be implemented as environmental sensor 428 of second hearing device 420, subsequently referred to as a second environmental sensor. In particular, each of environmental sensor 411, 421 may be implemented as one environmental sensor 136-139 illustrated in FIG. 2, or any other environmental sensor.

In some implementations, first and second environmental sensor 418, 428 are each implemented as temperature sensor 138 configured to detect a temperature in the ambient environment. Sensor data 221, 222 provided by temperature sensor 418, 428 may thus be indicative of the detected temperature. The detected temperate may indicate a heating of the respective hearing device 410, 420 caused by the sunlight emitted by sun 405. Thus, the detected temperate can indicate an amount of the sunlight impinging on the respective hearing device 410, 420. Therefore, the detected temperate can indicate a quality of sensor data 211, 212 provided by optical sensor 411, 421 which can be reduced when sunlight is impinging on hearing device 410, 420. In some implementations, the quality measure can be determined based on sensor data 221, 222 provided by first and second temperature sensor 418, 428, in particular the first quality measure determined in operation 311 and/or the second quality measure determined in operation 312. When sensor data 221, 222 provided by first and second temperature sensor 418, 428 indicates a higher temperature, for instance a temperature above a predefined temperature threshold, a quality of sensor data 211, 212 provided by first and second optical sensor 418, 428 may be determined to have a lower quality in the quality measure as compared to when sensor data 221, 222 indicates a lower temperature, for instance a temperature below the predefined temperature threshold.

In some implementations, first and second environmental sensor 418, 428 are each implemented as optical sensor 139 configured to detect light in the ambient environment. Sensor data 221, 222 provided by optical sensor 418, 428 may thus be indicative of the light detected in the ambient environment. The detected light may indicate light emitted from sun 405 impinging on the respective hearing device 410, 420. Therefore, the detected light can indicate a quality of sensor data 211, 212 provided by optical sensor 411, 421 indicative of a physiological property of user 404 which can be reduced when sunlight is impinging on hearing device 410, 420. In some implementations, the quality measure can be determined based on sensor data 221, 222 provided by first and second optical sensor 418, 428, in particular the first quality measure determined in operation 311 and/or the second quality measure determined in operation 312.

An amount of sunlight emitted by sun 405 impinging on user 404 can vary depending on an orientation of the user's head relative to sun 405. For example, as illustrated, sun 405 may be located at one side of the head at which second hearing device 420 is worn. The side of the head at which first hearing device 410 is worn can thus correspond to a shadow side at which sunlight emitted by sun is not impinging or at least less strongly impinging, in particular not directly impinging without any reflection from the ambient environment. Sensor data 211 provided by optical sensor 411 of first hearing device 410 can thus have a higher quality than sensor data 212 provided by optical sensor 421 of second hearing device 420. Such a quality difference may be indicated by the first quality measure determined in operation 311 and the second quality measure determined in operation 312. The priority parameter determined in operation 302 may then indicate a priority of first ear operational mode 208 relative to a binaural operational mode 202 and/or relative to second ear operational mode 209.

Figure 17:
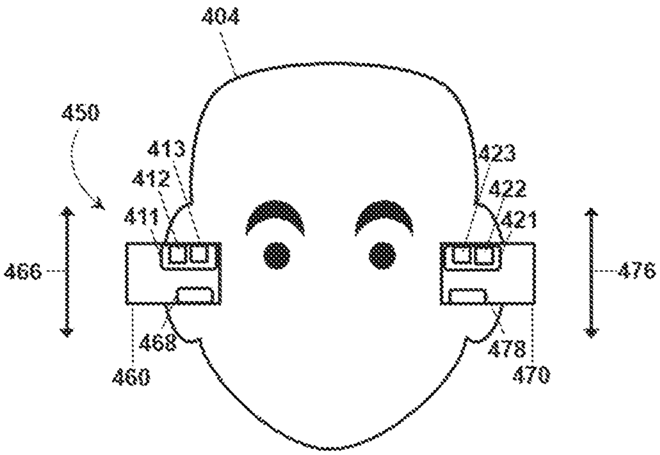

FIG. 17 illustrates a hearing system 450 worn by user 404 in a usage situation in which user 404 is moving, for instance walking or running. Corresponding up and down movements of the user's head are indicated by arrows 466, 476. Hearing system 450 comprises a first hearing device 460 worn at a first ear of user 404, and a second hearing device 470 worn at a second ear of user 404. First hearing device 460 may be implemented as first hearing device 110, 160 of any hearing system 100, 150 illustrated in FIGS. 1 and 4. Second hearing device 470 may be implemented as second hearing device 120, 170 of any hearing system 100, 150 illustrated in FIGS. 1 and 4. First hearing device 460 comprises first optical sensor 411 configured to provide sensor data 211 indicative of a physiological property of user 404, and second hearing device 470 comprises second optical sensor 421 configured to provide sensor data 212 indicative of the same physiological property of user 404 as sensor data 211 provided by first optical sensor 411.

The up and down movement of the user's head can cause a corresponding movement 466 of first hearing device 460 worn at the first ear of user 404, and a corresponding movement 467 of second hearing device 470 worn at the second ear of user 404. Movements 466, 467 can disturb a measurement of the physiological property performed by optical sensor 411, 421, in particular by causing movement artifacts in sensor data 211, 212 provided by optical sensor 411, 421, reducing a quality of sensor data 211, 212 provided by optical sensor 411, 421.

In some implementations, first and second hearing device 460, 470 each comprise a supplementary physiological sensor 468, 478 supplementary to optical sensor 411, 421. In any of hearing system 100, 150, 200, first supplementary sensor 118 may be implemented as supplementary physiological sensor 468 of first hearing device 460, subsequently referred to as a first supplementary physiological sensor, and second supplementary sensor 128 may be implemented as supplementary physiological sensor 478 of second hearing device 470, subsequently referred to as a second supplementary physiological sensor. In particular, each of supplementary physiological sensor 468, 478 may be implemented as one physiological sensor 131-134 illustrated in FIG. 2, or any other physiological sensor.

In some implementations, first and second supplementary physiological sensor 468, 478 are each implemented as movement sensor 132 configured to detect a movement of the respective hearing device 460, 470 and thus a corresponding movement of user 404. Sensor data 221, 222 provided by movement sensor 468, 478 may thus be indicative of the movement of hearing device 460, 470. The detected movement can indicate a quality of sensor data 211, 212 provided by optical sensor 411, 421 indicative of a physiological property of user 404 which can be reduced when movement 466, 476 is more pronounced increasing an occurrence of movement artifacts in sensor data 211, 212. In some implementations, the quality measure can be determined based on sensor data 221, 222 provided by the respective movement sensor 468, 478, in particular the first quality measure may be determined in operation 311 based on movement data provided by first movement sensor 468 and/or the second quality measure may be determined in operation 312 based on movement data provided by second movement sensor 478.

In some situations, the movement artifacts caused by movements 566, 476 may be equally present in sensor data 211, 212 provided by first and second optical sensor 411, 421. Sensor data 221, 222 provided by first and second movement sensor 468, 478 may then be indicative of the same amount of movements of the respective hearing device 460, 470. The first and second quality measure determined in operations 311, 312 may then indicate a low quality of both sensor data 211 provided by first optical sensor 411 and sensor data 212 provided by second optical sensor 421. The priority parameter determined in operation 302 may then indicate a priority of synchronous operational mode 207 relative to another binaural operational mode 202, in particular asynchronous operational mode 205 or mixed operational mode 206, and/or relative to monaural operational mode 204, in particular first ear operational mode 208 or second ear operational mode 209. Thus, sensor data 211, 212 may be provided by first and second optical sensor 411, 421 simultaneously at equal times in order to improve the overall quality of sensor data 211, 212.

In some situations, the movement artifacts caused by movements 566, 476 may be more present in sensor data 211, 212 provided by one of first and second optical sensor 411, 421, and less present in sensor data 211, 212 provided by the other of first and second optical sensor 411, 421. Sensor data 221, 222 provided by first and second movement sensor 468, 478 may then be indicative of a different amount of movements of the respective hearing device 460, 470. The first and second quality measure determined in operations 311, 312 may then indicate a lower quality of one of the sensor data 211, 212 provided by one of the first and second optical sensor 411, 421, and a higher quality of the other sensor data 212 provided by the other of first and second optical sensor 411, 421. For instance, one of hearing devices 460, 470 may be less fitted into the respective ear as compared to the other hearing device which may cause a larger movement of the respective hearing device. The priority parameter determined in operation 302 may then indicate a priority of a monaural operational mode 204, in particular first ear operational mode 208 or second ear operational mode 209, as compared to a binaural operational mode 202, in particular asynchronous operational mode 205 or mixed operational mode 206 or synchronous operational mode 207.

In some cases, a health assessment (e.g., an assessment of cardiovascular health, cardiovascular disease, peripheral arterial health, venous system health, arterial disease, compliance, ageing, endothelial function, vasospastic conditions, microvascular blood flow, etc.) may be performed based on sensor data (e.g., PPG data) generated by two or more physiological sensors (e.g., PPG sensors). For example, sensor data output by a first physiological sensor may be compared with sensor data output by a second physiological sensor. In some scenarios, a difference between the sensor data output by the first and second physiological sensors may indicate a disease or complication in the physiological property of the user being assessed in the health assessment. Unfortunately, such multi-site physiological sensor measurement systems may be expensive and may require a timely clinical setup.

Accordingly, in some instances, it may be desirable to provide a hearing system having a first and second physiological sensor that may be used in performing a health assessment. For example, an illustrative hearing system may include a first hearing device configured to be worn at a first ear of a user, the first hearing device comprising a first physiological sensor configured to provide sensor data indicative of a physiological property of the user, and a second hearing device configured to be worn at a second ear of the user, the second hearing device comprising a second physiological sensor configured to provide sensor data indicative of the same physiological property as the sensor data provided by the first physiological sensor. The hearing device may further include a processing unit configured to control the first and second physiological sensors to alternatingly and/or simultaneously provide the sensor data to the processing unit.

To illustrate, the processing unit may be configured to compare a signal property of the sensor data provided by the first physiological sensor with the same signal property of the sensor data provided by the second physiological sensor. A difference between the signal property of the sensor data provided by the first and second physiological sensors may be indicative of a disease or complication in the physiological property of the user. When the difference between the signal property of the sensor data provided by the first and second physiological sensors is above a threshold, the processing unit may be configured to perform an operation with respect to the hearing device. For example, the processing unit may provide an output signal indicative of the difference and/or control the first and second physiological sensors to simultaneously provide the sensor data to the processing unit at an equal time.

In some implementations, prior to comparing the signal property of the sensor data provided by the first and second physiological sensors, the processing unit may be configured to determine a first quality measure indicative of a quality of the sensor data provided by the first physiological sensor and a second quality measure indicative of a quality of the sensor data provided by the second physiological sensor. When the first and second quality measures are above a threshold, the processing unit may then be configured to compare the signal property of the sensor data provided by the first and second physiological sensors. Such first and second quality measures may indicate that the sensor data provided by the first and second physiological sensors is sufficiently accurate for performing a health assessment based on the sensor data. For example, when the first and second quality measures are above a threshold, a difference between the signal property of the sensor data provided by the first and second physiological sensors may be attributed to a disease or complication in the physiological property of the user instead of environmental influences of the first and second physiological sensors.

The principles described herein may result in improved hearing systems compared to conventional systems that are not configured to generate sensor data by two or more physiological sensors, as well as provide other benefits as described herein. For example, a hearing system configured to generate sensor data by two or more physiological sensors may provide continuous monitoring capability of the physiological property of the user in an inexpensive and/or compact configuration. Moreover, a hearing system configured to determine a quality measure of the sensor data prior to performing a health assessment based on the sensor data may provide a more accurate health assessment.

Figure 18:
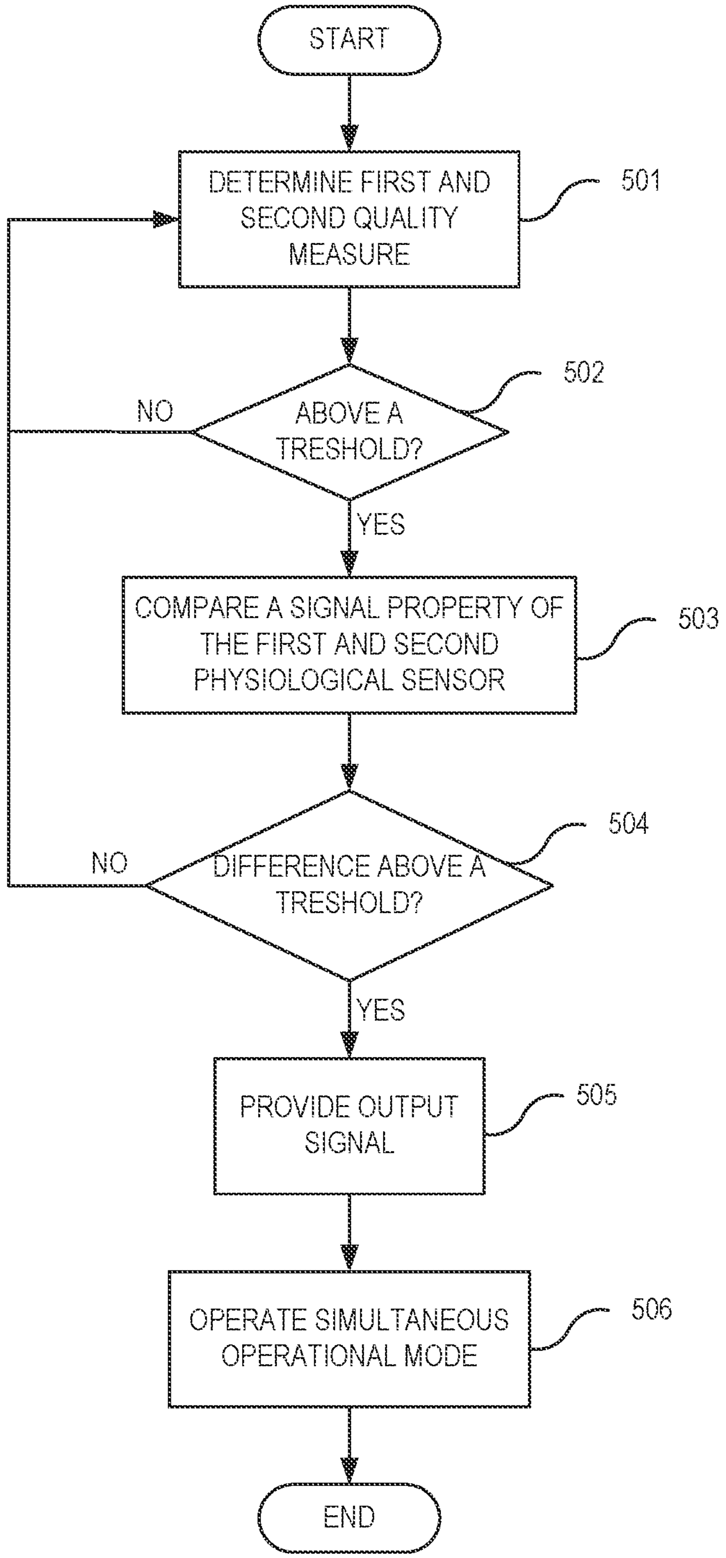
FIG. 18 illustrates another exemplary method of operating a hearing system according to principles described herein.

FIG. 18 illustrates a block flow diagram for an exemplary method of operating hearing system 100. The method may be executed by processing unit 112, 122. Processing unit 112, 122 may control hearing system 100 in a binaural operational mode 203, including an asynchronous operational mode 205, a mixed operational mode 206, and/or a synchronous operational mode 207, as described above. For example, in some instances, the first and second physiological sensor 119, 129 may be controlled to alternatingly provide sensor data 211, 212 in subsequent time intervals, wherein, in at least one of the subsequent time intervals, one of first and second physiological sensor 119, 129 is controlled to provide sensor data 211, 212 to processing unit 112, 122 and the other of first and second physiological sensor 119, 129 is controlled to abstain from providing sensor data 211, 212 to processing unit 112, 122. Additionally or alternatively, the first and second physiological sensor 119, 129 may be controlled to simultaneously provide the sensor data at an equal time in any of said subsequent time intervals.

At 501, while hearing system 100, 150 is operated in a binaural operational mode, processing unit 112, 122 may be configured to determine a first and second quality measure. The first quality measure may be indicative of a quality of first physiological sensor data 211, and a second quality measure may be indicative of a quality of second physiological sensor data 212. In particular, the first quality measure may be determined based on first physiological sensor data 211, and the second quality measure may be determined based on second physiological sensor data 212. For example, the first quality measure may be determined based on a signal-to-noise ratio of first physiological sensor data 211, and the second quality measure may be determined based on a signal-to-noise ratio of second physiological sensor data 212. As another example, when first and second physiological sensor 119, 129 are implemented as an optical sensor each comprising a light source and a photodetector configured to detect light emitted from the light source, the first quality measure may be determined based on light detected by the photodetector of first physiological sensor 119 which is unrelated to the light emitted from the light source of first physiological sensor 119, for instance light detected by the photodetector having a different wavelength than the light emitted from the light source, and the second quality measure may be determined based on light detected by the photodetector of second physiological sensor 129 which is unrelated to the light emitted from the light source of second physiological sensor 129.

As an illustrative example, when the first and second physiological sensors 119, 129 are controlled to alternatingly provide sensor data 211, 212 in subsequent time intervals, the first quality measure may be determined based on sensor data 211 provided by first physiological sensor 119 during a first time interval and the second quality measure may be determined based on sensor data 212 provided by second physiological sensor 129 during a second time interval. In implementations where the first and second physiological sensors 119, 129 are controlled to asynchronously provide the sensor data at different times, the first and second quality measure may be determined based on sensor data 211 asynchronously provided by first and second physiological sensor 119, 129 at the different times, e.g. during at least two subsequent time intervals. In implementations where the first and second physiological sensors 119, 129 are controlled to simultaneously provide the sensor data at an equal time, the first and second quality measure may be determined based on sensor data 211 simultaneously provided by first and second physiological sensor 119, 129 at an equal time during a time interval. The first quality measure may also be determined based on sensor data provided by first supplementary sensor 118 which may be provided supplementary to first physiological sensor 119. The second quality measure may also be determined based on sensor data provided by second supplementary sensor 128 which may be provided supplementary to second physiological sensor 129. In some instances, the first and second quality measure may then be determined independently from sensor data 211, 212 provided by first and second physiological sensor 119, 129 in the temporal sequence.

At 502, processing unit 112, 122 may be configured to determine that first and second quality measures are above a threshold. For example, the first and second quality measures may be represented by any suitable metric, such as a discrete value (e.g., an integer, a percentage, a level, a range, a probability value, etc.). In some implementations, the first and second quality measures having a value above a threshold (e.g., greater than about 50%, greater than about 75%, and/or greater than about 90%) may indicate a sufficient accuracy of first physiological sensor data 211 and second physiological sensor data 212 such that a health assessment may be performed based on sensor data 211, 212. Alternatively, the first and second quality measures having a value below the threshold may indicate an insufficient accuracy of first physiological sensor data 211 and/or second physiological sensor data 212 for performing a health assessment based on sensor data 211, 212. For example, the first and second quality measures having a value below the threshold may indicate that first physiological sensor data 211 and/or second physiological sensor data 212 may have been affected by environmental influences of sensors 119, 129 (e.g., insufficient placement of sensors 119, 129, motion of sensors 119, 219, etc.).

When the first and second quality measures are above the threshold, processing unit 112, 122 may be configured to compare a signal property of the sensor data provided by first and second physiological sensors 119, 129 at 503. For example, processing unit 112, 122 may be configured to compare a signal property of the sensor data 211 provided by the first physiological sensor 119 with the same signal property of the sensor data 212 provided by the second physiological sensor 129. A signal property of sensor data 211, 212 may include one or more of: wave shape, frequency, amplitude, pulse transit time, pulse wave velocity, beat to beat normalized amplitude variability, magnitude squared coherence, derivative, etc.

At 504, processing unit 112, 122 may be configured to determine that a difference between the signal property of the first physiological sensor data 211 and the second physiological sensor data 212 is above a threshold. For example, the signal property and/or the difference between the signal property of the first physiological sensor data 211 and the second physiological sensor data 212 may be represented by any suitable metric, such as a discrete value (e.g., an integer, a percentage, a level, a range, a probability value, etc.). In some implementations, the difference between the signal property of the first physiological sensor data 211 and the second physiological sensor data 212 having a value above a threshold (e.g., a difference greater than about 50%, greater than about 75%, and/or greater than about 90%) may indicate a disease or complication of the physiological property.

When the difference between the signal property of the first physiological sensor data 211 and the second physiological sensor data 212 has a value above the threshold, processing unit 122, 122 may be configured to perform an operation with respect to hearing system 100. For example, processing unit 112, 122 may, at 505, provide an output signal indicative of the difference. Such an output signal may include an audio signal provided to an output transducer 117, 127 included in a hearing device of hearing system 100, 150 to output a voice signal informing the user about the difference and/or a radio signal and/or an electronic signal that may be transmitted to remote device 180 and/or another device, wherein remote device 180 and/or the other device may be a display device (e.g., a mobile phone, a watch, etc.) configured to display a text message informing the user and/or a significant other and/or a healthcare professional about the difference. E.g., the output signal may include a warning message about a presence of such a difference and/or a quantitative and/or qualitative estimation of the difference and/or an indication of a disease and/or complication in a physiological property associated with the difference. To illustrate, a difference determined in a signal property of sensor data 211, 212, which may be provided, e.g., by a first and second optical sensor each included in a different hearing device of hearing system 100, 150, e.g., a PPG sensor, may be an indicator of an arterial and/or venous disease, e.g. atherosclerosis. The output signal may then comprise information about the difference in the signal property and/or information about the disease and/or complication of a blood vessel property associated with the difference.

Additionally or alternatively, when the signal property of the sensor data provided by first and second physiological sensors 119, 129 has been compared at 503 between the sensor data which has been asynchronously provided by first and second physiological sensors 119, 129 at different times, processing unit 112, 122 may, at 506, control the first and second physiological sensors 119, 129 to simultaneously provide sensor data 211, 212 to the processing unit at an equal time. This may allow hearing system 100 to collect additional data with respect to the physiological property of the user. In some implementations, processing unit 112, 122 may be configured to store the difference and/or sensor data 211, 212 in memory 183. This may allow the difference and/or sensor data 211, 212 to be analyzed later by a health specialist. When processing unit 112, 122 is configured to compare the signal property of sensor data 211, 212 provided by the first and second physiological sensors 119, 129 at the equal time, and when a difference between the signal property of sensor data 211, 212 is above the threshold, processing unit 112, 122 may be configured to provide an output signal indicative of the difference.

While the principles of the disclosure have been described above in connection with specific devices, systems, and methods, it is to be clearly understood that this description is made only by way of example and not as limitation on the scope of the invention. The above described embodiments are intended to illustrate the principles of the invention, but not to limit the scope of the invention. Various other embodiments and modifications to those embodiments may be made by those skilled in the art without departing from the scope of the present invention that is solely defined by the claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A hearing system comprising:

a first hearing device configured to be worn at a first ear of a user, the first hearing device comprising a first physiological sensor configured to provide sensor data indicative of a physiological property of the user;

a second hearing device configured to be worn at a second ear of the user, the second hearing device comprising a second physiological sensor configured to provide sensor data indicative of the same physiological property as the sensor data provided by the first physiological sensor; and a processing unit configured to control, in a binaural asynchronous operational mode, the first and second physiological sensors to alternatingly provide the sensor data to the processing unit in at least two subsequent time intervals, wherein, when one of the first and second physiological sensor is controlled to provide the sensor data to the processing unit in the at least two subsequent time intervals, the other of the first and second physiological sensor is controlled to abstain from providing the sensor data to the processing unit.

2. The hearing system of claim 1, wherein the processing unit is configured to change from the binaural asynchronous operational mode into a monaural operational mode, in which one of the first and second physiological sensors is controlled to provide the sensor data to the processing unit in all of said subsequent time intervals, and the other of the first and second physiological sensor is controlled to abstain from providing the sensor data to the processing unit in all of said subsequent time intervals.

3. The hearing system of claim 1, wherein the processing unit is configured to change from the binaural asynchronous operational mode into a synchronous operational mode, in which the first and second physiological sensors are controlled to simultaneously provide the sensor data to the processing unit at an equal time in all of said subsequent time intervals.

4. The hearing system of claim 1, wherein the processing unit is configured to control the first and second physiological sensor to abstain from providing the sensor data to the processing unit during an intermediate time interval between said subsequent time intervals.

5. The hearing system of claim 1, wherein the processing unit comprises a first processor included in the first hearing device and a second processor included in the second hearing device, wherein the first processor and the second processor are communicatively coupled.

6. The hearing system of claim 1, wherein the processing unit is configured to control one of the first and second physiological sensor to provide the sensor data to the processing unit and the other of the first and second physiological sensor to abstain from providing the sensor data to the processing unit in a first number of time intervals of said subsequent time intervals, and to control the first and second physiological sensor to simultaneously provide the sensor data to the processing unit at an equal time in a second number of time intervals of said subsequent time intervals.

7. The hearing system of claim 1, wherein the processing unit is configured to:

determine, in said binaural asynchronous operational mode, a priority parameter indicative of a priority of at least one of a monaural operational mode or a synchronous operational mode relative to the binaural asynchronous operational mode, wherein, in the monaural operational mode, one of the first and second physiological sensors are controlled to provide the sensor data to the processing unit in all of said subsequent time intervals and the other of the first and second physiological sensor is controlled to abstain from providing the sensor data to the processing unit in all of said subsequent time intervals, wherein, in the synchronous operational mode, the first and second physiological sensors are controlled to simultaneously provide the sensor data to the processing unit at an equal time in all of said subsequent time intervals; and change, depending on the priority parameter, from the binaural asynchronous operational mode to a select one of the monaural operation mode or the synchronous operational mode.

8. The hearing system of claim 7, wherein the first hearing device comprises a first battery and the second hearing device comprises a second battery, the processing unit configured to obtain information about a charging status of the first and second battery, wherein said priority parameter is determined depending on the charging status of the first and second battery.

9. The hearing system of claim 7, wherein the processing unit is configured to determine a first quality measure indicative of a quality of the sensor data provided by the first physiological sensor, and a second quality measure indicative of a quality of the sensor data provided by the second physiological sensor, wherein said priority parameter is determined depending on the first quality measure and the second quality measure.

10. The hearing system of claim 9, wherein the processing unit is configured to determine the first quality measure based on a signal-to-noise ratio of the sensor data provided by the first physiological sensor, and the second quality measure based on a signal-to-noise ratio of the sensor data provided by the second physiological sensor.

11. The hearing system of claim 9, wherein the first and second physiological sensor each comprise a light source and a photodetector configured to detect light emitted from the light source, wherein the processing unit is configured to determine the first and second quality measure based on light detected by the photodetectors which is unrelated to the light emitted by the light sources.

12. The hearing system of claim 9, wherein:

the first hearing device comprises a first supplementary sensor supplementary to the first physiological sensor, the first supplementary sensor configured to provide sensor data indicative of at least one of a different property of the user or an environment of the user than the sensor data provided by the first physiological sensor; and the second hearing device comprises a second supplementary sensor supplementary to the second physiological sensor, the second supplementary sensor configured to provide sensor data indicative of the same property as the first supplementary sensor, wherein the processing unit is configured to determine the first and second quality measure based on the sensor data provided by the first and second supplementary sensor.

13. The hearing system of claim 12, wherein the first and second supplementary sensor is each configured to detect a temperature, wherein the first and second quality measure is determined based on the detected temperatures.

14. The hearing system of claim 12, wherein the first supplementary sensor is configured to detect a movement of the first hearing device and the second supplementary sensor is configured to detect a movement of the second hearing device, wherein the first and second quality measure is determined based on the detected movements.

15. A method of operating a hearing system, the hearing system comprising a first hearing device configured to be worn at a first ear of a user and a second hearing device configured to be worn at a second ear of the user, the first hearing device comprising a first physiological sensor configured to provide sensor data indicative of a physiological property detected on the user, the second hearing device comprising a second physiological sensor configured to provide sensor data indicative of the same physiological property as the sensor data provided by the first physiological sensor, the method comprising the step of:

controlling, in a binaural mode, the first and second physiological sensors to alternatingly provide the sensor data in at least two subsequent time intervals, wherein, when one of the first and second physiological sensor is controlled to provide the sensor data in the at least two subsequent time intervals, the other of the first and second physiological sensor is controlled to abstain from providing the sensor data.

16. A hearing system comprising:

a first hearing device configured to be worn at a first ear of a user, the first hearing device comprising a first physiological sensor configured to provide sensor data indicative of a physiological property of the user;

a second hearing device configured to be worn at a second ear of the user, the second hearing device comprising a second physiological sensor configured to provide sensor data indicative of the same physiological property as the sensor data provided by the first physiological sensor; and a processing unit configured to control the first and second physiological sensors to alternatingly provide the sensor data to the processing unit;

wherein, during a first time interval, one of the first and second physiological sensor is controlled to provide the sensor data to the processing unit and the other of the first and second physiological sensor is controlled to abstain from providing the sensor data to the processing unit;

wherein, during a second time interval different from the first time interval, the other of the first and second physiological sensors is controlled to provide sensor data to the processing unit and the one of the first and second physiological sensors is controlled to abstain from providing the sensor data to the processing unit.

17. The hearing system of claim 16, wherein the processing unit is configured to determine a first quality measure indicative of a quality of the sensor data provided by the first physiological sensor and a second quality measure indicative of a quality of the sensor data provided by the second physiological sensor, wherein, when the first and second quality measures are above a threshold, the processing unit is configured to compare a signal property of the sensor data provided by the first physiological sensor with the same signal property of the sensor data provided by the second physiological sensor.

18. The hearing system of claim 17, wherein, when a difference between the signal property of the sensor data provided by the first and second physiological sensors is above a threshold, the processing unit is configured to provide an output signal indicative of the difference.

19. The hearing system of claim 18, wherein, when a difference between the signal property of the sensor data provided by the first and second physiological sensors is above a threshold, the processing unit is configured to control the first and second physiological sensors to simultaneously provide the sensor data to the processing unit at an equal time.

20. The hearing system of claim 19, wherein the processing unit is configured to compare the signal property of the sensor data provided by the first physiological sensor with the same signal property of the sensor data simultaneously provided by the second physiological sensor at the equal time, wherein, when a difference between the signal property of the sensor data provided by the first and second physiological sensors provided at the equal time is above a threshold, the processing unit is configured to provide an output signal indicative of the difference.

* * * * *